United States Patent
Savard et al.

(10) Patent No.: US 12,103,362 B2
(45) Date of Patent: Oct. 1, 2024

(54) RAM AIR VENT FOR A VEHICLE

(71) Applicant: BOMBARDIER RECREATIONAL PRODUCTS INC., Valcourt (CA)

(72) Inventors: Laurent Savard, Granby (CA); Mathieu Hamel-Gagnon, Sherbrooke (CA); Patrick Mathieu, Granby (CA); Jerome Lefrancois, Sherbrooke (CA); Louis-Charles Gingras, Rougemont (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 523 days.

(21) Appl. No.: 16/913,715

(22) Filed: Jun. 26, 2020

(65) Prior Publication Data
US 2020/0406714 A1    Dec. 31, 2020

Related U.S. Application Data

(60) Provisional application No. 62/866,669, filed on Jun. 26, 2019.

(51) Int. Cl.
*B01D 45/08* (2006.01)
*B01D 46/00* (2022.01)
(Continued)

(52) U.S. Cl.
CPC ............. *B60H 1/262* (2013.01); *B01D 45/08* (2013.01); *B01D 46/001* (2013.01); *B01D 46/10* (2013.01);
(Continued)

(58) Field of Classification Search
CPC ........ B60H 1/262; B60H 1/30; B60H 3/0641; B01D 45/08; B01D 46/001; B01D 46/10;
(Continued)

(56) References Cited

U.S. PATENT DOCUMENTS 1,577,176 A * 3/1926 Connet ................... C02F 1/687
73/198
1,985,947 A * 1/1935 O'Mara .................... B04C 5/14
55/432

(Continued)

FOREIGN PATENT DOCUMENTS

CN 206531231 U * 9/2017
GB 2545650 A * 6/2017 ......... B60H 1/00364
(Continued)

OTHER PUBLICATIONS

Office Action issued from the Canadian Intellectual Property Office on Feb. 21, 2024 in connection with the corresponding application No. 3,084,924.

*Primary Examiner* — Dung H Bui
(74) *Attorney, Agent, or Firm* — BCF LLP

(57) ABSTRACT

A ram air vent for a vehicle has a base defining a base aperture therein; a hood connected to the base over the base aperture, the hood and base defining a forwardly facing air inlet therebetween, the hood and the base defining an air passage extending from the air inlet to the base aperture; a baffle disposed in the air passage for deflecting air flowing in the air passage from the air inlet for separating water from air flowing in the air passage, the baffle facing the air inlet; and at least one water passage defined in at least one of the base or the hood. The at least one water passage exits a rear side of the ram air vent. The at least one water passage drains water separated from air flowing in the air passage from the ram air vent.

18 Claims, 15 Drawing Sheets

(51) Int. Cl.
  *B01D 46/10* (2006.01)
  *B01D 50/20* (2022.01)
  *B60H 1/26* (2006.01)
  *B60H 1/30* (2006.01)
  *B60H 3/06* (2006.01)
(52) U.S. Cl.
  CPC ............... *B01D 50/20* (2022.01); *B60H 1/30* (2013.01); *B60H 3/0641* (2013.01); *B01D 2279/35* (2013.01)
(58) Field of Classification Search
  CPC ................ B01D 50/20; B01D 2279/35; B01D 46/2403; B01D 46/0005; B60Y 2200/124
  See application file for complete search history.

(56) References Cited

U.S. PATENT DOCUMENTS

| | | | | |
|---|---|---|---|---|
| 2,881,860 A * | 4/1959 | Ternes | ................... | F02M 35/14 55/385.3 |
| 3,085,690 A * | 4/1963 | May | ....................... | B01D 45/08 210/315 |
| 3,401,620 A * | 9/1968 | Armstrong | ............. | B60H 1/262 454/145 |
| 3,472,147 A * | 10/1969 | Grasseler | ........... | B60H 1/00378 454/157 |
| 3,481,117 A * | 12/1969 | McKinlay | ........ | F02M 35/10255 137/485 |
| 3,552,103 A * | 1/1971 | Smith | .................... | F02M 35/04 55/501 |
| 3,657,992 A * | 4/1972 | Minnick, Jr. | ....... | B60H 1/00378 55/467 |
| 3,722,182 A * | 3/1973 | Gilbertson | ............. | B03C 3/155 454/156 |
| 3,738,088 A * | 6/1973 | Colosimo | ................ | B03C 3/32 55/482 |
| 3,868,896 A * | 3/1975 | Doll | ..................... | B60H 3/0616 55/385.3 |
| 4,038,911 A * | 8/1977 | Hart | ........................ | F24F 13/10 454/94 |
| 4,162,660 A * | 7/1979 | Albertson | ............. | F02M 35/09 116/DIG. 25 |
| 4,420,057 A * | 12/1983 | Omote | ................... | B60K 13/02 123/41.7 |
| 4,492,151 A * | 1/1985 | Mattei | ....................... | F24F 8/10 236/94 |
| 4,551,304 A * | 11/1985 | Holter | ................... | B01D 53/86 95/137 |
| 4,581,988 A * | 4/1986 | Mattei | ............... | B60H 1/00378 96/111 |
| 4,725,296 A * | 2/1988 | Kurotobi | ........... | F02M 35/0203 55/497 |
| 4,778,029 A * | 10/1988 | Thornburgh | ....... | F02M 35/1205 181/263 |
| 4,869,737 A * | 9/1989 | Parenti | ...................... | B04C 3/04 96/400 |
| 4,895,065 A | 1/1990 | Lamparter | | |
| 4,960,041 A * | 10/1990 | Kiser | ....................... | F24F 11/72 454/238 |
| 5,050,487 A * | 9/1991 | Arold | ................... | B60H 3/0625 55/502 |
| 5,059,224 A * | 10/1991 | Kikkawa | ............. | B60H 3/0616 55/385.2 |
| 5,086,858 A * | 2/1992 | Mizuta | ................... | B60K 13/06 55/385.3 |
| 5,147,430 A * | 9/1992 | Kidd | ...................... | B01D 46/10 55/505 |
| 5,342,238 A * | 8/1994 | Segerpalm | ........... | B60H 3/0608 454/158 |
| 5,468,183 A * | 11/1995 | Hahn | ................. | B60H 1/00414 454/158 |
| 5,526,684 A * | 6/1996 | Liu | ...................... | B01D 19/0057 96/216 |
| 5,564,513 A * | 10/1996 | Wible | ................... | F02M 35/161 180/68.3 |
| 5,591,922 A * | 1/1997 | Segeral | ..................... | G01F 1/74 73/861.04 |
| 5,676,913 A * | 10/1997 | Cirillo | .................... | B01D 53/75 423/247 |
| 5,912,368 A * | 6/1999 | Satarino | ................ | B01D 46/30 55/444 |
| 5,976,385 A * | 11/1999 | King | ........................ | C02F 1/505 210/242.1 |
| 6,217,439 B1 * | 4/2001 | Janeling | ............... | B60H 3/0641 55/467 |
| 6,361,428 B1 * | 3/2002 | Tosconi | ................. | B60H 1/262 454/158 |
| 6,463,901 B1 * | 10/2002 | Cuddihee, Sr. | ...... | F02M 35/024 123/184.21 |
| 6,685,825 B1 * | 2/2004 | Chang | ...................... | C02F 1/78 210/90 |
| 6,755,881 B2 * | 6/2004 | Ruehle | .................... | F02M 35/04 55/498 |
| 7,452,395 B2 * | 11/2008 | Fiello | ................. | B01D 46/2403 55/482 |
| 7,493,881 B2 * | 2/2009 | Smith | ............... | F02M 35/10255 123/184.21 |
| 7,794,525 B2 * | 9/2010 | Fiello | ............... | F02M 35/10013 55/DIG. 28 |
| 8,181,728 B2 * | 5/2012 | Hartland | .......... | F02M 35/10386 180/68.1 |
| 8,875,830 B2 | 11/2014 | Massicotte et al. | | |
| 9,308,484 B1 * | 4/2016 | Harper | ................. | B60H 3/0608 |
| 9,427,692 B2 * | 8/2016 | Tashiro | ................ | B01D 47/022 |
| 10,618,403 B2 * | 4/2020 | Fiello | ................. | F02M 35/048 |
| 10,928,225 B1 * | 2/2021 | Krishnan | ................ | G01D 11/245 |
| 2003/0029145 A1 * | 2/2003 | Sudoh | ................... | B01D 46/0004 55/497 |
| 2004/0035294 A1 * | 2/2004 | Atkinson | ............... | B01D 45/04 95/216 |
| 2004/0139858 A1 * | 7/2004 | Entezarian | ............. | B01D 46/30 95/275 |
| 2005/0028498 A1 * | 2/2005 | Entezarian | ............. | B01D 50/20 55/467 |
| 2005/0210892 A1 * | 9/2005 | Reinders | ............. | B60H 1/00364 62/310 |
| 2006/0086073 A1 * | 4/2006 | Fiello | ..................... | B01D 46/64 55/385.3 |
| 2006/0288676 A1 * | 12/2006 | Geyer, III | .......... | B01D 46/2403 55/498 |
| 2008/0083575 A1 * | 4/2008 | Smith | ...................... | B60K 13/02 180/68.3 |
| 2008/0110339 A1 * | 5/2008 | Kwok | ................... | F24C 15/2035 95/79 |
| 2010/0126198 A1 * | 5/2010 | Holguin | ................ | F24F 13/222 62/289 |
| 2010/0170398 A1 * | 7/2010 | Bercich | ............... | B60H 1/00364 96/140 |
| 2012/0079946 A1 * | 4/2012 | Dold | ....................... | B01D 45/08 55/283 |
| 2013/0276767 A1 * | 10/2013 | Polichetti | ............. | F02M 25/06 123/573 |
| 2014/0094107 A1 * | 4/2014 | Randleman | ............ | B62D 25/06 454/142 |
| 2015/0352924 A1 * | 12/2015 | Allard | .................... | B60H 1/262 454/94 |
| 2016/0166971 A1 * | 6/2016 | Fukuhara | ................ | B01D 46/62 96/108 |
| 2017/0043647 A1 * | 2/2017 | Vergamini | ............. | B60H 3/022 |
| 2018/0066858 A1 * | 3/2018 | Fiser | ..................... | B01D 46/00 |
| 2018/0207565 A1 * | 7/2018 | Morishita | .......... | F01M 13/0405 |
| 2018/0222311 A1 * | 8/2018 | Toupin | ................... | B60K 11/06 |
| 2019/0092120 A1 * | 3/2019 | Davter | ............... | B60H 1/00378 |
| 2019/0168146 A1 * | 6/2019 | Garrett | ................ | B01D 46/003 |
| 2020/0114724 A1 * | 4/2020 | Chauvel | ............... | B60H 3/0641 |

(56) References Cited

U.S. PATENT DOCUMENTS

2020/0215879 A1* 7/2020 Chevalier ............ B60H 3/0616
2022/0150392 A1* 5/2022 Maddox ............. H04N 5/22521

FOREIGN PATENT DOCUMENTS

| WO | WO-2017149442 A1 * | 9/2017 | ......... B60H 1/00364 |
| WO | 2017187411 A1 | 11/2017 | |
| WO | WO-2017187413 A1 * | 11/2017 | ............. B60K 11/06 |

* cited by examiner

RAM AIR VENT FOR A VEHICLE

CROSS-REFERENCE

The present application claims priority to U.S. Provisional Application No. 62/866,669, filed on Jun. 26, 2019, entitled "RAM AIR VENT FOR A VEHICLE", the entirety of which is incorporated herein by reference.

FIELD OF TECHNOLOGY

The present technology relates to a ram air vent for vehicles and a vehicle having such a ram air vent.

BACKGROUND

There exist various types of vehicles used mainly in off-road conditions. One such type is the side-by-side off-road vehicle (SSV). The name "side-by-side" refers to the seating arrangement of the vehicle in which the driver and a passenger are seated side-by-side. Some side-by-side off-road vehicles also have a second row of seats to accommodate one or more additional passengers. These vehicles may have a frame, a roof, windows, doors, one or more seats, wheels and tires, one or more motors, a roll cage, and/or a steering wheel.

The frame, roof, windows, and doors may form an enclosed cabin. The enclosed cabin of the SSV may become hot, such that a driver and/or passenger of the SSV may wish to reduce the temperature of the enclosed cabin.

The enclosed cabin may have one or more vents to allow air into the enclosed cabin, which may reduce the temperature of the enclosed cabin and/or provide moving air into the enclosed cabin. SSVs may be operated in various weather conditions, such as in wet and/or raining conditions. When used in wet and/or raining conditions, the vents of the enclosed cabin may allow water to enter the enclosed cabin. It may be preferable to reduce the amount of water that enters the enclosed cabin via the vents.

Thus there is a desire for an arrangement of components for supplying air to an enclosed cabin that is suitable for the operating conditions of side-by-side off-road vehicles.

SUMMARY

It is an object of the present technology to ameliorate at least some of the inconveniences present in the prior art.

A ram air vent is attached to the roof of an SSV to allow air to flow into the cabin. The ram air vent is configured to prevent water from entering the cabin through the ram air vent. One or more baffles are used to separate the water from the air. The ram air vent has one or more water passages that allow the water to drain outside of the vehicle. A hydrophobic mesh may be used in the ram air vent to further separate water from the air flowing through the ram air vent. An air filter may be used in the ram air vent to remove dust or debris from the air. After passing through the baffles, hydrophobic mesh, and air filter, air flows into the cabin via outlet vents. The outlet vents may be adjustable, so that users can open and close the outlet vents, and so that users can select where air flowing from the outlet vents is directed.

According to one aspect of the present technology, there is provided a ram air vent for a vehicle. The ram air vent has a base, a hood, a baffle, and at least one water passage. The base defines a base aperture therein. The hood is connected to the base over the base aperture. The hood and the base define a forwardly facing air inlet therebetween. The hood and the base define an air passage extending from the air inlet to the base aperture. The baffle is disposed in the air passage for deflecting air flowing in the air passage from the air inlet for separating water from air flowing in the air passage. The baffle faces the air inlet. The at least one water passage is defined in at least one of the base or the hood. The at least one water passage exits a rear side of the ram air vent. The at least one water passage drains water separated from air flowing in the air passage from the ram air vent.

According to some implementations of the present technology, the base aperture is disposed generally perpendicularly to the air inlet.

According to some implementations of the present technology, the at least one water passage has at least one water outlet defined between the hood and the base.

According to some implementations of the present technology, the baffle extends downwards from the hood.

According to some implementations of the present technology, the baffle is a first baffle and the ram air vent has a second baffle. The second baffle is disposed in the air passage for deflecting air flowing in the air passage from the air inlet for separating water from air flowing in the air passage. The second baffle faces the air inlet and extends upward from the base.

According to some implementations of the present technology, the second baffle is disposed rearward of the first baffle.

According to some implementations of the present technology, the ram air vent has an adapter to be disposed between the base and the roof of the vehicle. The adapter is selected from a plurality of adapters, each of which is configured for a particular roof type.

According to some implementations of the present technology, the ram air vent has a seal disposed on a bottom surface of the base.

According to some implementations of the present technology, the ram air vent has an outlet vent assembly connected to the base. The outlet vent assembly is disposed below the base. The outlet vent assembly defines at least one outlet vent fluidly communicating with the base aperture for allowing air to exit the ram air vent.

According to some implementations of the present technology, the ram air vent has an air filter disposed between the base aperture and the at least one outlet vent.

According to some implementations of the present technology, the at least one outlet vent is at least one variable outlet vent.

According to some implementations of the present technology, a degree of opening of the at least one variable outlet vent is adjustable and the at least one variable outlet vent is selectively closable.

According to some implementations of the present technology, the outlet vent assembly is selectively connected to the base such that the outlet vent assembly can be removed.

According to some implementations of the present technology, a bottom of the at least one variable outlet vent is vertically higher than a bottom of the outlet vent assembly.

According to some implementations of the present technology, the ram air vent has a pre-filter housing. The pre-filter housing is connected to the base under the hood and over the base aperture. The pre-filter housing defines at least one pre-filter aperture fluidly communicating the air passage with the base aperture. The ram air vent has a hydrophobic mesh disposed in the at least one pre-filter aperture.

According to some implementations of the present technology, the at least one water passage is defined in the base.

According to another aspect of the present technology, there is provided a vehicle having a frame, a cabin floor connected to the frame, two doors connected to the frame, a windshield connected to the frame, a roof connected to the frame, at least one ground engaging member operatively connected to the frame, a motor connected to the frame, and a ram air vent connected to the roof. The cabin floor, the two doors, the windshield, and the floor define in part a cabin. The vehicle has at least one seat disposed in the cabin. The motor is operatively connected to at least one of the at least one ground engaging member. The ram air vent is for supplying air to the cabin. The ram air vent has a base, a hood, a baffle, and at least one water passage. The base defines a base aperture therein. The base is connected to the roof. The hood is connected to the base over the base aperture. The hood and the base define a forwardly facing air inlet therebetween. The hood and the base define an air passage extending from the air inlet to the base aperture. The base aperture fluidly communicates the air passage with the cabin. The baffle is disposed in the air passage for deflecting air flowing in the air passage from the air inlet for separating water from air flowing in the air passage. The baffle faces the air inlet. The at least one water passage is defined in at least one of the base or the hood. The at least one water passage exits a rear side of the ram air vent. The at least one water passage drains water separated from air flowing in the air passage from the ram air vent.

According to some implementations of the present technology, the base aperture is disposed generally perpendicularly to the air inlet.

According to some implementations of the present technology, the at least one water passage has at least one water outlet defined between the hood and the base.

According to some implementations of the present technology, the baffle extends downwards from the hood.

According to some implementations of the present technology, the baffle is a first baffle and the ram air vent has a second baffle. The second baffle is disposed in the air passage for deflecting air flowing in the air passage from the air inlet for separating water from air flowing in the air passage. The second baffle faces the air inlet and extends upward from the base.

According to some implementations of the present technology, the second baffle is disposed rearward of the first baffle.

According to some implementations of the present technology, the ram air vent has an adapter disposed between the base and the roof. The adapter is selected from a plurality of adapters each of which is configured for a particular roof type.

According to some implementations of the present technology, the ram air vent has a seal disposed between the base and the roof.

According to some implementations of the present technology, the ram air vent has an outlet vent assembly connected to the base. The outlet vent assembly is disposed below the base inside the cabin. The outlet vent assembly defines at least one outlet vent fluidly communicating with the base aperture for allowing air to exit the ram air vent and to flow into the cabin.

According to some implementations of the present technology, the ram air vent has an air filter disposed between the base aperture and the at least one outlet vent.

According to some implementations of the present technology, the at least one outlet vent is at least one variable outlet vent.

According to some implementations of the present technology, the degree of opening of the at least one variable outlet vent is adjustable and the at least one variable outlet vent is selectively closable.

According to some implementations of the present technology, the outlet vent assembly is selectively connected to the base such that the vent assembly can be removed.

According to some implementations of the present technology, a bottom of the at least one variable outlet vent is disposed above a bottom of the outlet vent assembly.

According to some implementations of the present technology, the at least one seat is two seats disposed side-by-side. The at least one outlet vent is disposed laterally between the two seats.

According to some implementations of the present technology, the ram air vent has a pre-filter housing connected to the base under the hood and over the base, aperture. The pre-filter housing defines at least one pre-filter aperture fluidly communicating the air passage with the base aperture. A hydrophobic mesh is disposed in the at least one pre-filter aperture.

According to some implementations of the present technology, the ram air vent is removable from the roof.

According to some implementations of the present technology, the at least one ground engaging member is four wheels. The vehicle has a roll cage connected to the frame and disposed over the at least one seat.

According to some implementations of the present technology, the at least one water passage is defined in the base.

For purposes of this application, terms related to spatial orientation such as forwardly, rearward, upwardly, downwardly, left, and right, are as they would normally be understood by a driver of the vehicle sitting thereon in a normal driving position. Terms related to spatial orientation when describing or referring to components or sub-assemblies of the vehicle, separately from the vehicle should be understood as they would be understood when these components or sub-assemblies are mounted to the vehicle, unless specified otherwise in this application. In the event of a discrepancy between an explanation in the present application and an explanation in a document incorporated herein by reference, the explanation in the present application takes precedence.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described with respect to a four-wheel off-road vehicle 2 having two side-by-side seats 18 and a steering wheel 5. However, it is contemplated that some aspects of the present technology may apply to other types of vehicles such as, but not limited to, off-road vehicles having more or less than four wheels, and/or off-road vehicles having more or less than two seats.

Figure 1:
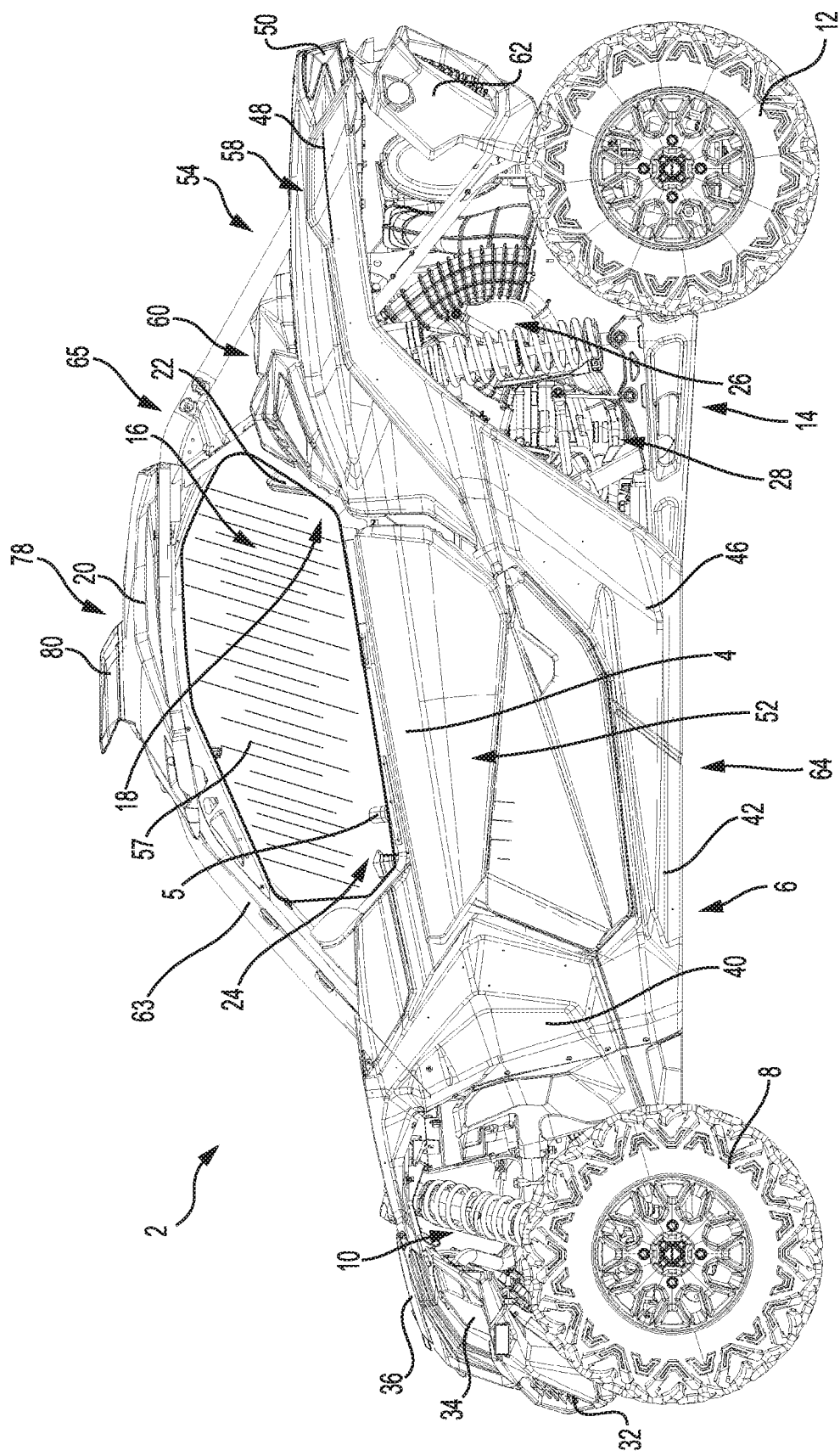
FIG. 1 is a left side elevation view of a side-by-side off-road vehicle (SSV) with a ram air vent.

The general features of the off-road vehicle 2 will be described with respect to FIG. 1. The vehicle 2 has a frame 6 and four ground engaging members, which in the present implementation are two front wheels 8 connected to a front of the frame 6 by front suspension assemblies 10 and two rear wheels 12 connected to the frame 6 by rear suspension assemblies 14.

The frame 6 defines a central cabin area 16 inside which are disposed two seats 18, a driver seat and a passenger seat, which are disposed side-by-side. In some implementations, it is contemplated that the central cabin area 16 could include seats in addition to the driver seat and the passenger seat. The driver seat is disposed on the left side of the vehicle 2 and the passenger seat is disposed on the right side of the vehicle 2. It is contemplated that the driver seat 18 could be disposed on the right side of the vehicle 2 and that the passenger seat 18 could be disposed on the left side of the vehicle 2. Each seat 18 has a seat bottom (not shown), a seat back (not shown) and a headrest 22. A roll cage 65 is connected to the frame 6 and is disposed over the seats 18. A roof 20 is connected to the roll cage 65 and covers the cabin area 16. A cabin floor 64 is connected to the frame 6. The cabin floor 64 provides a floor for the cabin area 16. A windshield 63 is connected to the frame 6. The windshield 63 is disposed at the front of the cabin area 16.

A steering wheel 5 is disposed in front of the driver seat 18. The steering wheel 5 is used to turn the front wheels 8 and/or rear wheels 12 to steer the vehicle 2. Various displays and gauges 24 are disposed in front of the steering wheel 5 to provide information to the driver regarding the operating conditions of the vehicle 2. Examples of displays and gauges 24, are, but are not limited to, a speedometer, a tachometer, a fuel gauge, a transmission position display, and/or an oil temperature gauge.

A four-stroke internal combustion engine 26 is connected to the frame 6 in a rear portion of the vehicle 2. It is contemplated that the engine 26 could be another type of motor such as a two-stroke internal combustion engine, a diesel engine, or an electric motor. The engine 26 is connected to a continuously variable transmission (CVT) 28 disposed on a left side of the engine 26. In some implementations, a dual clutch transmission (DCT) could be used. The CVT 28 includes a CVT housing inside which a primary pulley (not shown), a secondary pulley (not shown) and a belt (not shown) of the CVT 28 are housed. The CVT 28 is operatively connected to a transaxle (not shown) to transmit torque from the engine 26 to the transaxle. The transaxle is disposed behind the engine 26. The primary pulley of the CVT 28 is mounted to an output shaft of the engine 26. The secondary pulley of the CVT 28 is mounted to an input shaft of the transaxle. The belt of the CVT 28 is looped around the primary and secondary pulleys to transmit torque between the primary and secondary pulleys. The transaxle is operatively connected to the front and rear wheels 8, 12 to propel the vehicle 2. A fuel tank (not shown) is suspended from the frame 6 in front of the passenger seat and stores the fuel to be used by the engine 26.

The vehicle 2 has a number of body panels mounted to the frame 6. The body panels are connected to the frame 6. The panels help protect the internal components of the vehicle 2 and provide some of the aesthetic features of the vehicle 2. A front fascia 32 is connected to a front of the frame 6. The front fascia 32 defines two apertures inside which the headlights 34 of the vehicle 2 are disposed. A hood 36 extends generally horizontally rearward from a top of the front fascia 32. Front fenders 40 are disposed rearward of the front fascia 32 on each side of the vehicle 2. Each front fender 40 is disposed in part above and in part behind of its corresponding front wheel 8. Lower panels 42 extend along the bottom of the frame 6 rearward of the front wheels 8. A generally L-shaped panel 46 is disposed behind the rear end of each lower panel 42. Generally L-shaped rear fenders 48 extend upward and then rearward from the rear, upper ends of the L-shaped panels 46. Each rear fender 48 is disposed in part above and in part forward of its corresponding rear wheel 12. The rear fenders 48 define apertures at the rear thereof to receive the brake lights 50 of the vehicle 2. It is contemplated that the brake lights 50 could be replaced with reflectors or that reflectors could be provided in addition to the brake lights 50. Rear panels 62 are connected to the rear of the frame 6.

On each side of the vehicle 2, the front fender 40, the lower panel 42, the L-shaped panel 46 and the rear fender 48 define a passage 52 through which a driver (or passenger depending on the side of the vehicle 2) can enter or exit the vehicle 2. Each side of the vehicle 2 is provided with a door 4 that selectively closes the corresponding passage 52. Each door 4 comprises a window 57. The windows 57 can be made from clear plastic, glass or any other transparent material. The doors 4 and/or windows 57 may be removable.

Each door 4 is hinged at a front thereof to its associated portion of the frame 6. Each door 4 is also selectively connected at a rear thereof to the frame 6 via a releasable latch (not shown). It is contemplated that each door 4 could be hinged at a rear thereof and latched at a front thereof. When the doors 4 are closed the doors 4 close the passage 52, thereby enclosing the cabin area 16. The cabin floor 64, doors 4, windshield 63, and windows 57 define the cabin area 16.

The rear fenders 48 define a cargo space 54 therebetween behind the seats 18. The cargo space 54 has a floor 58 extending horizontally between the rear fenders 48. The floor 58 has a plurality of apertures such that the floor 58 can act as an attachments base to receive anchors such as those described in U.S. Pat. No. 8,875,830, issued Nov. 4, 2014, the entirety of which is incorporated herein by reference, in order to secure various items in the cargo space 54. It is contemplated that hooks or loops could be provided instead of or in addition to the apertures in the floor 58. It is also contemplated that the floor 58 might not be provided with any attachment features. It is contemplated that the floor 58 could be replaced by a cargo box that can be tilted in order to dump its content. A separation wall 60 is connected to the frame 6, extends laterally and is disposed longitudinally between the seats 18 and the floor 58 of the cargo space 54. As a result, the separation wall 60 separates the cabin area 16 from the cargo space 54. A rear window (not shown) extends between the separation wall 60 and the roof 20.

Figure 9:
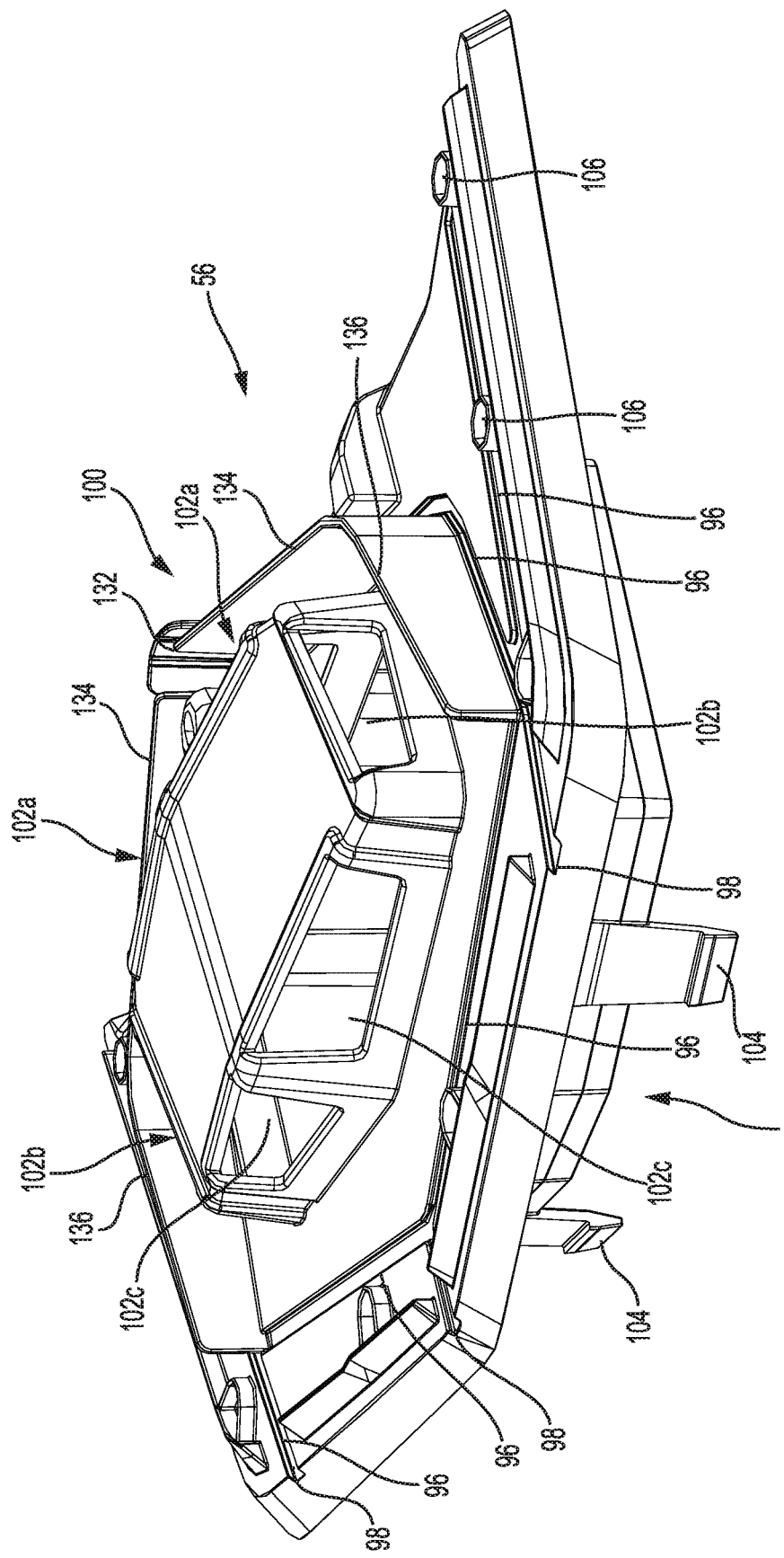
FIG. 9 is a perspective view taken from a rear, right side of the base of the ram air vent of the vehicle of FIG. 1.

A ram air vent 78 is attached to the roof 20. The ram air vent 78 provides ventilation to the cabin area 16 while the vehicle 2 is moving in a generally forward direction. The forward movement of the vehicle 2 causes air to enter the ram air vent 78. In the event that water is present in the air, such as when it is raining, the ram air vent 78 separates water from the air prior to allowing the air to enter the cabin area 16. The water exits the ram air vent at the rear side of the ram air vent 78 via water passages 96 ending in water outlets 98, as can be seen in FIG. 9.

Turning now to FIGS. 2 to 13, the ram air vent 78 will be described in more detail. The ram air vent 78 has a hood 80, a base 56, a seal 82, a pre-filter housing 84, an adapter 86, an air filter 88, and an outlet vent assembly 90. Portions of the ram air vent 78, other than the seal 82 and air filter 88 may be made of composite materials or plastics, but other materials are contemplated. The seal 82 is made of ethylene-vinyl acetate (EVA) foam, but other elastic materials suitable for making a seal are contemplated. The air filter 88 is made of foam, but other materials suitable for making an air filter are contemplated.

Figure 5:
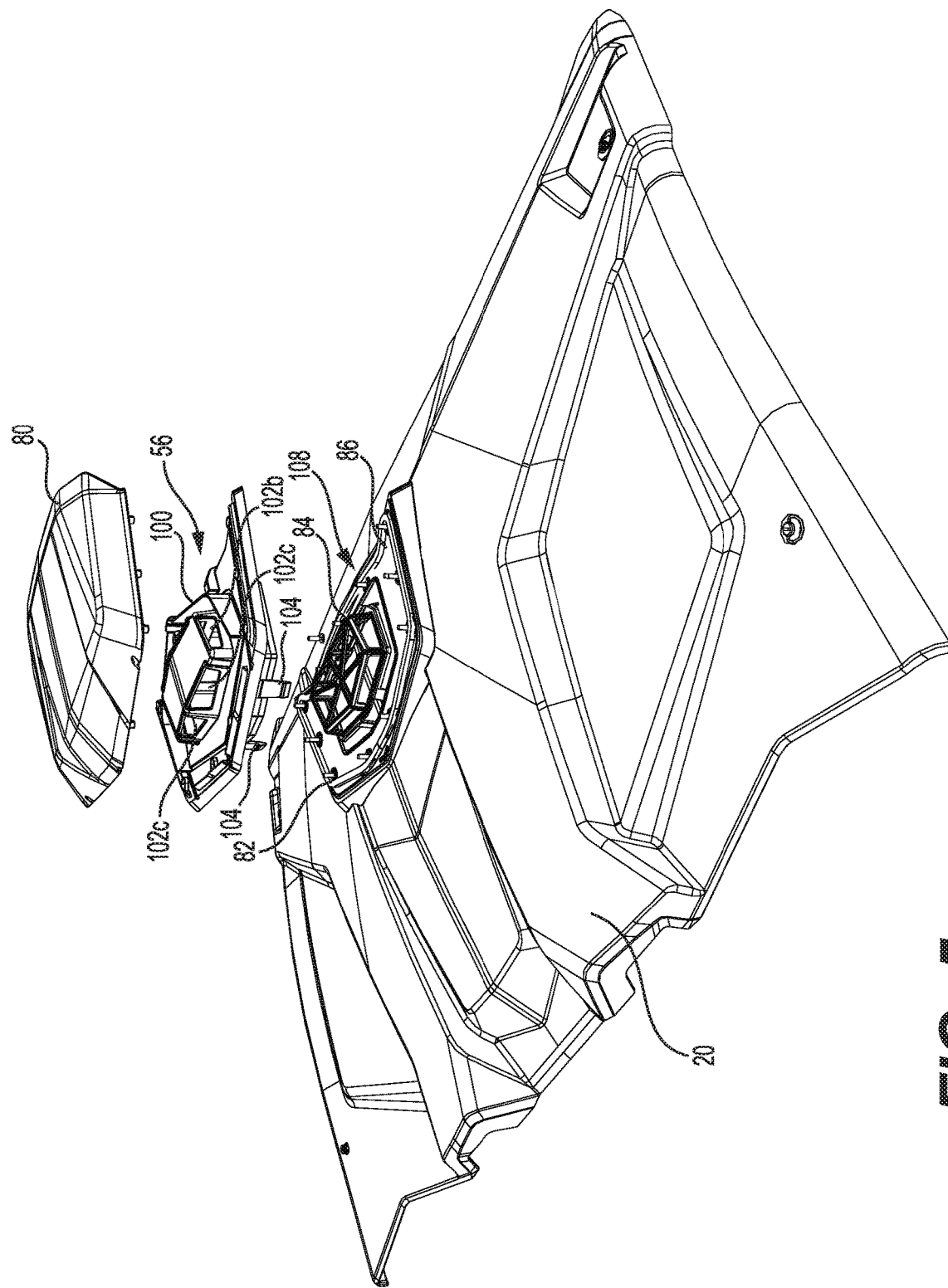
FIG. 5 is a partially exploded view taken from a rear, right side of the ram air vent and the roof of the vehicle of FIG. 1.
Figure 6:
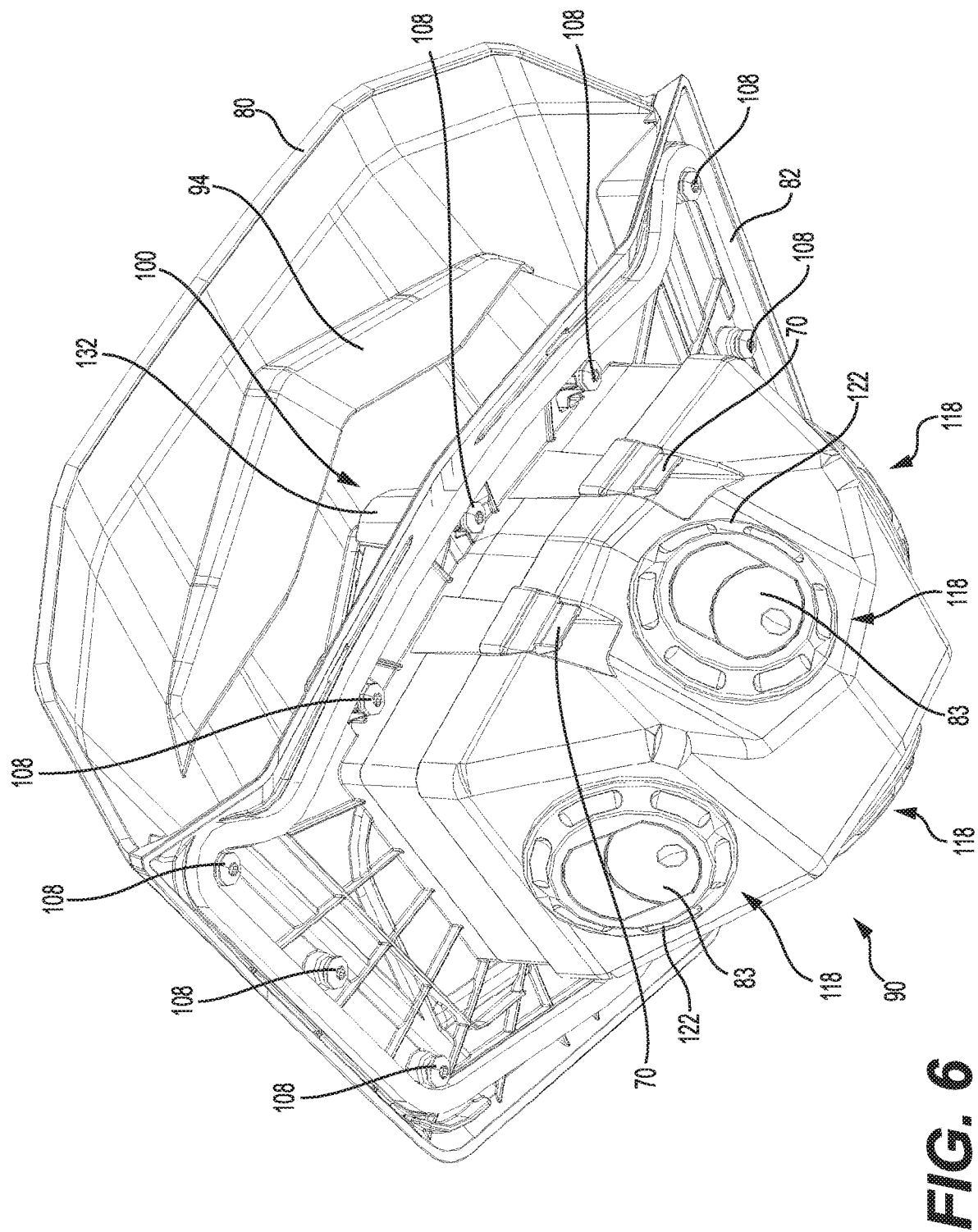
FIG. 6 is a perspective view taken from a bottom, front, right side of the ram air vent of the vehicle of FIG. 1.
Figure 7:
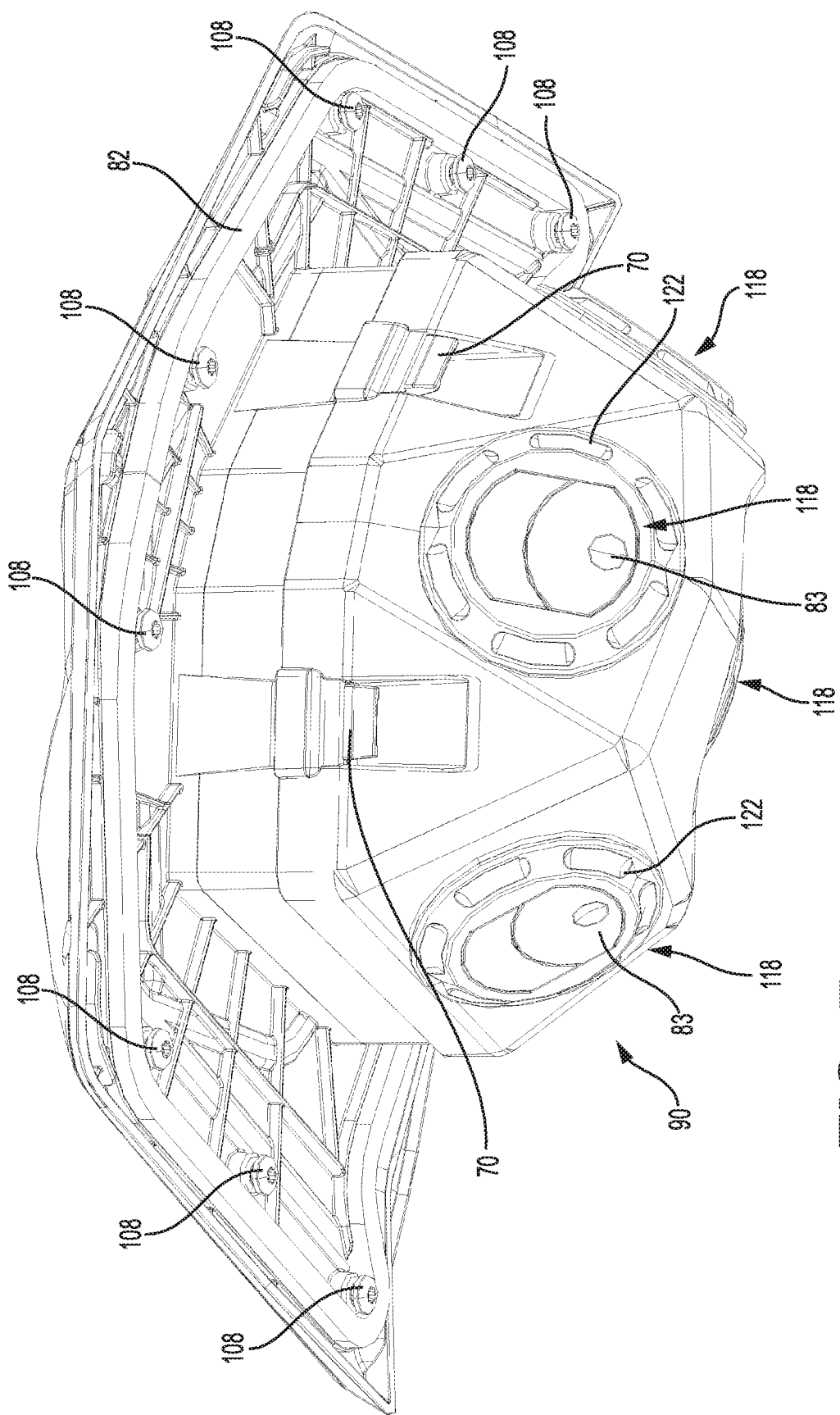
FIG. 7 is a perspective view taken from a bottom, rear, left side of the ram air vent of the vehicle of FIG. 1.
Figure 13:
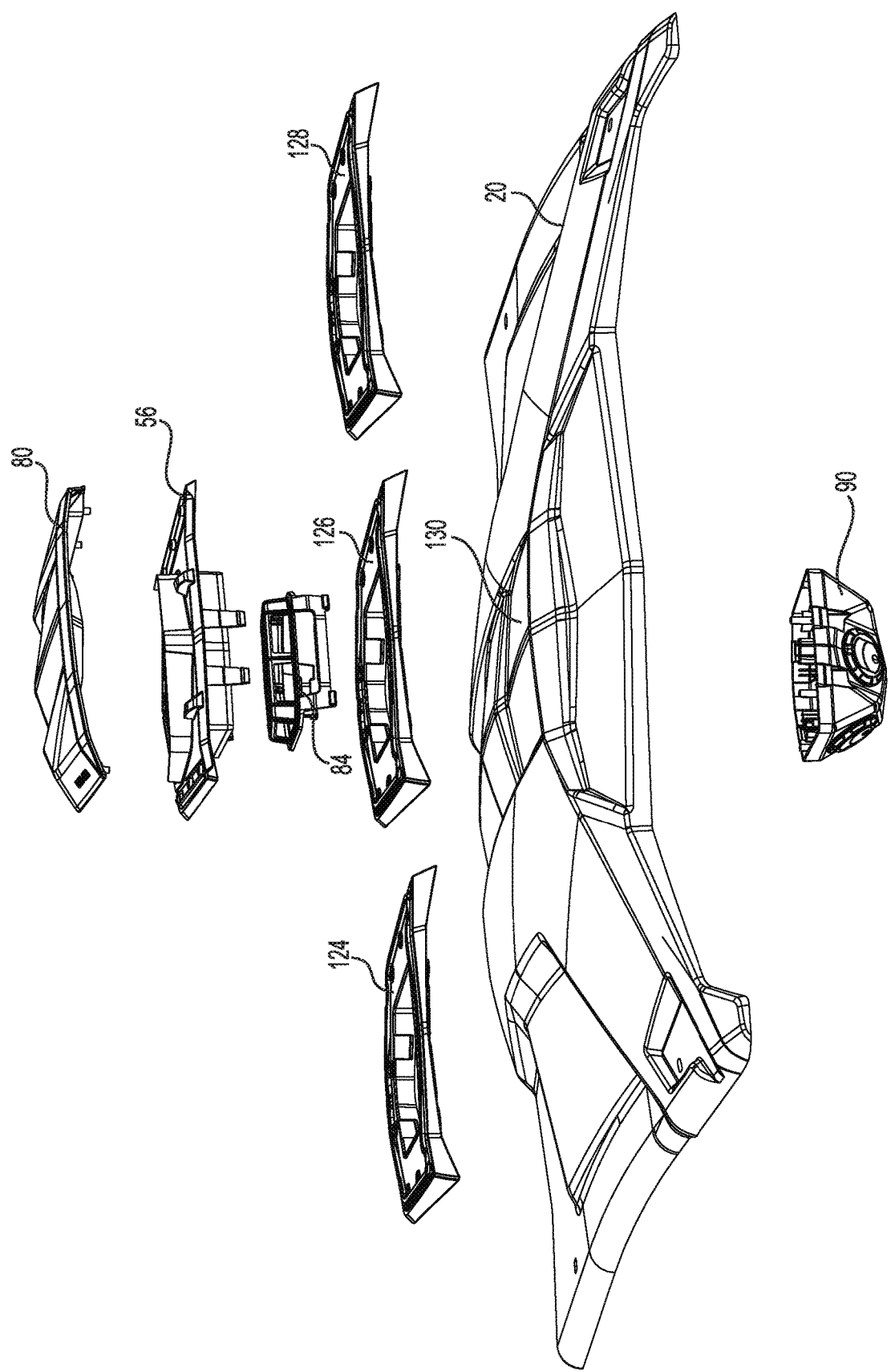
FIG. 13 is a partially exploded view of the ram air vent and the roof of the vehicle of FIG. 1 with multiple adapters taken from a front, right side.

The ram air vent 78 extends through an aperture 130 in the roof 20 of the vehicle, as can be seen in FIG. 13. In some implementations, the aperture 130 could be cut into an existing roof 20 of the vehicle 2, while in other implementations the aperture 130 could defined the roof 20 as manufactured. The hood 80 and the seal 82 are disposed above the roof 20. A portion of the base 56 is disposed above the roof 20 and a portion is disposed below the roof 20. The pre-filter housing 84 is disposed partially above the roof 20 and partially below. The air filter 88 and outlet vent assembly 90 are disposed below the roof 20. The seal 82 is disposed on a bottom surface of the base 56, as best seen in FIG. 6. The adapter 86 is optionally included in the ram air vent 78 and is disposed above the roof 20. For a vehicle 2 having a flat roof 20, the adapter 86 might not be used, such as in FIGS. 2 and 3. For a vehicle 2 having a curved roof, the adapter 86 may be used, such as in FIGS. 1, 4, and 5. The ram air vent 78 can be removed from the roof 20.

Figure 2:
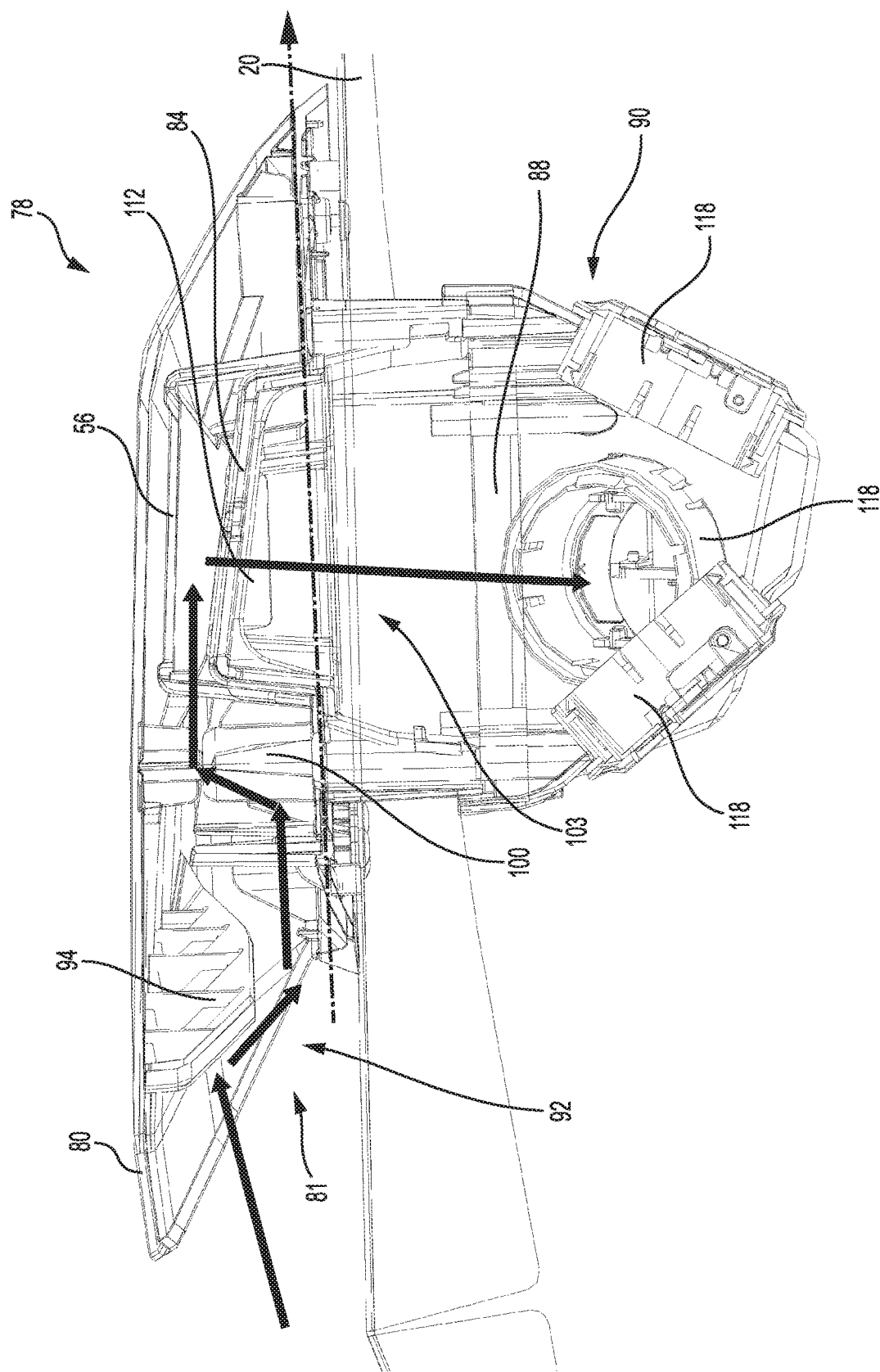
FIG. 2 is a longitudinal cross-section of the ram air vent of the vehicle of FIG. 1 shown on a flat roof.

With reference to FIG. 2, the hood 80 is connected to the base 56, over a base aperture 103 defined in the base 56. Fastening holes 106 (FIG. 9) in the base 56 are used with fasteners 108 (FIG. 3) to secure the base 56 to the roof 20. In the present implementation, the fasteners 108 are screws, but other types of fasteners are contemplated. An adapter 86 (FIG. 5), is used to attach the ram air vent 78 to the roof 20. The adapter 86 is disposed between the roof 20 and the base 56. The bottom of the adapter 86 is disposed on the top surface of the roof 20. The base 56 is disposed on the top surface of the adapter 86. The adapter 86 is sandwiched between the roof 20 and the base 56, thereby connecting the adapter 86 to the roof 20 by the fasteners 108. The fasteners 108 pass through fastening holes in the adapter 86 to reach the base 56. Each fastening hole in the adapter 86 is aligned with a corresponding fastening hole 106 in the base 56. The adapter 86 is selected from a plurality of adapters, each configured for a specific type of roof 20. Adapters 124, 126, and 128 in FIG. 13 illustrate different adapters that the adapter 86 may be selected from. Each of the adapters 124, 126, and 128 is configured for a different roof type 20 and/or a different vehicle 2. It is contemplated that the adapter 86 could be omitted such that the base 56 would be disposed directly on top of the roof 20.

With reference to FIG. 2, when the vehicle 2 is in motion, air and/or water enters the ram air vent 78 via an air inlet 92 beneath the hood 80. The general air flow direction is illustrated in FIG. 2 by solid arrows. The air inlet 92 is a forwardly facing aperture defined between the base 56 and the hood 80. The base aperture 103 is disposed generally perpendicular to the air inlet 92. After entering the air inlet 92, the air travels through the ram air vent 78 via an air passage 81. The air passage 81 is defined by the hood 80 and base 56. The air passage 81 extends from the air inlet 92 to the base aperture 103.

A baffle 94 is disposed in the air passage 81 and extends downwards from the hood 80. The baffle 94 is formed as part of the hood 80. The baffle 94 is disposed towards the front of the hood 80. The baffle 94 slants rearwards. The baffle 94 faces the air inlet 92. The baffle 94 is disposed rearward of a front edge of the hood 80. The baffle 94 is highest at a center of the baffle 94, and the baffle 94 slopes downward as it extends towards the left and right sides of the baffle 94. The baffle 94 extends the width of the hood 80. It is contemplated that the baffle 94 could be a separate part fastened or bonded to the hood 80. It is also contemplated that the baffle 94 could have a different shape than described above.

After entering the ram air vent 78, air and water contact the baffle 94. The contact with the baffle 94 causes at least some of the incoming water to be separated from the air. The water that was separated by the baffle 94 falls onto a top surface of the base 56. As best seen in FIG. 9, the base 56 defines water passages 96 that terminate in water outlets 98. The water passages 96 drain water separated from air flowing in the air passage 81. After falling onto the base 56, the water collects in the water passages 96. The water then flows, via the water passages 96, to the rear of the ram air vent 78, as illustrated by the arrow with the dashed line in FIG. 2. The water then exits the ram air vent 78 via the water outlets 98.

Two water passages 96 (FIG. 9) extend from a front to a rear of the base 56. Another water passage 96 surrounds the baffle 100, described in further detail below. Three water outlets 98 are defined between the hood 80 and the base 56. The water outlets 98 are on the rear side of the base 56. One water outlet 98 is near the left corner of the rear side of the base 56, one is in the center, and one is near the right corner. The water outlets 98 are disposed above the roof 20 of the vehicle 2. The water outlets 98 have a same width as the water passages 96. It is contemplated that any number of water passages 96 can be defined in the hood 80, the base 56, or partially in the hood 80 and partially in the base 56. It is contemplated that any number of water outlets 98 can be defined in the hood 80, in the base 56, and/or between the hood 80 and base 56. In the present implementations, the water passages 96 are troughs, but other configurations are contemplated.

Figure 3:
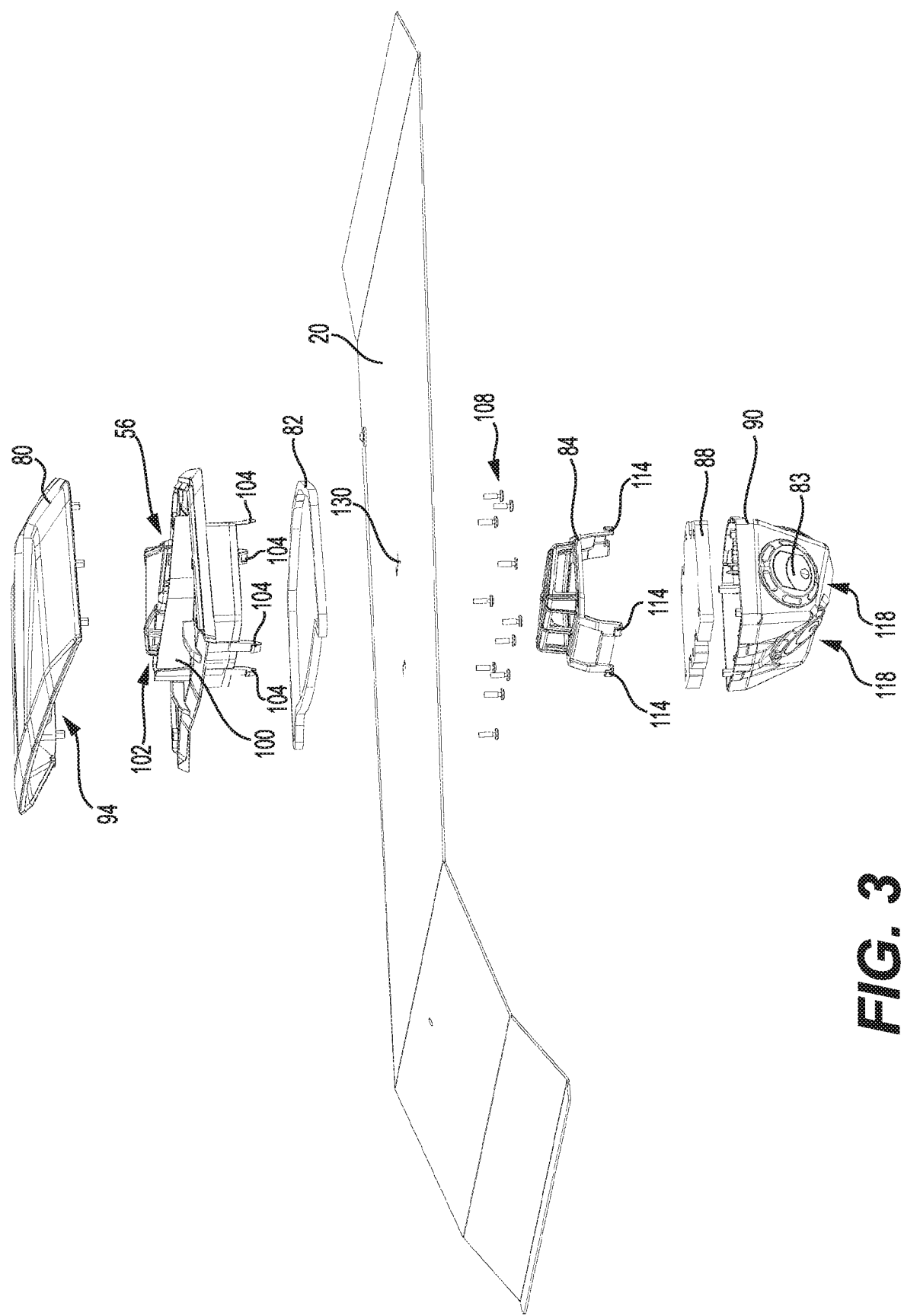
FIG. 3 is a partially exploded view taken from a front, left side of the ram air vent of the vehicle of FIG. 1 and part of the flat roof of FIG. 2.
Figure 4:
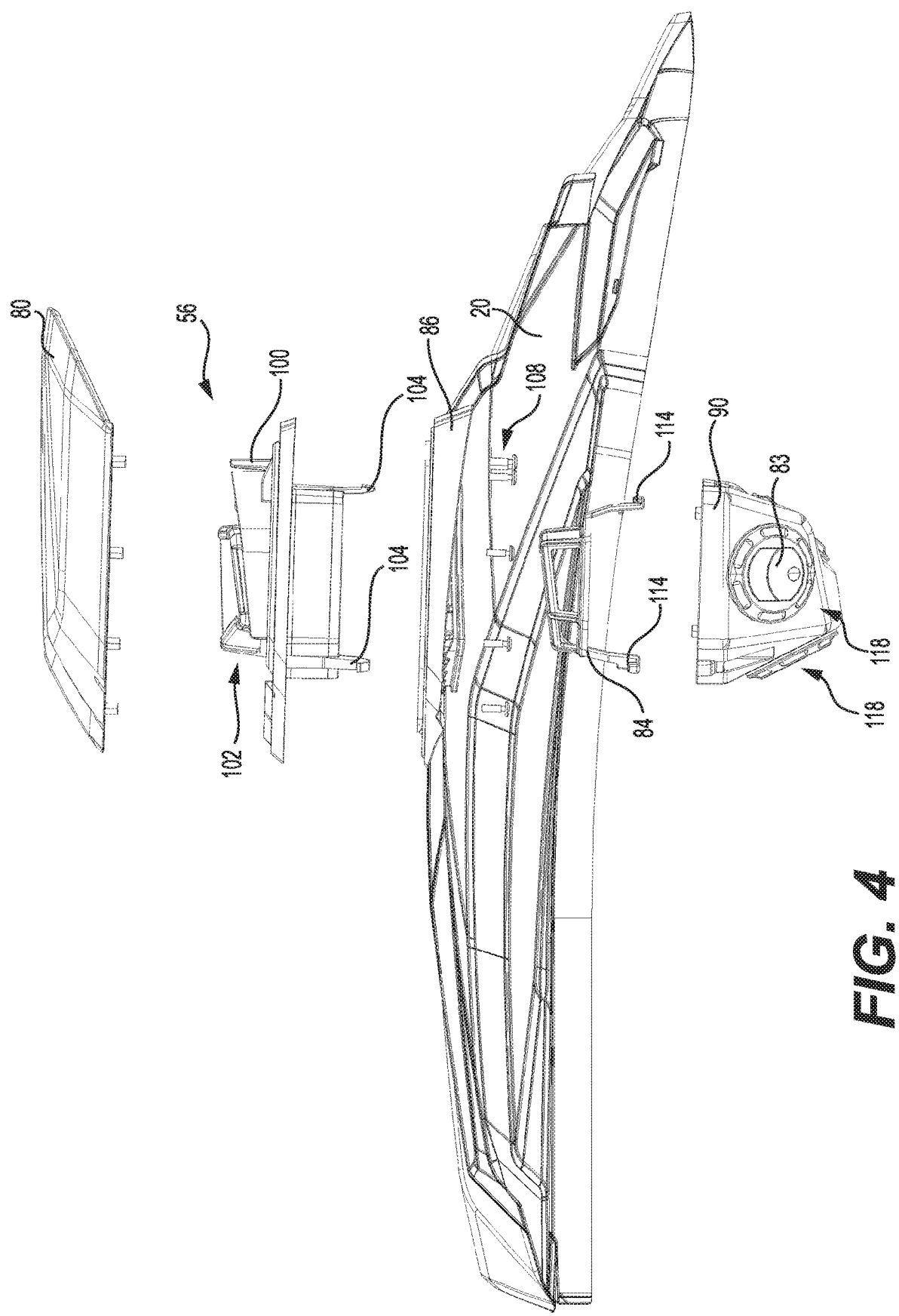
FIG. 4 is a partially exploded view taken from a right side of the ram air vent and the roof of the vehicle of FIG. 1.
Figure 8:
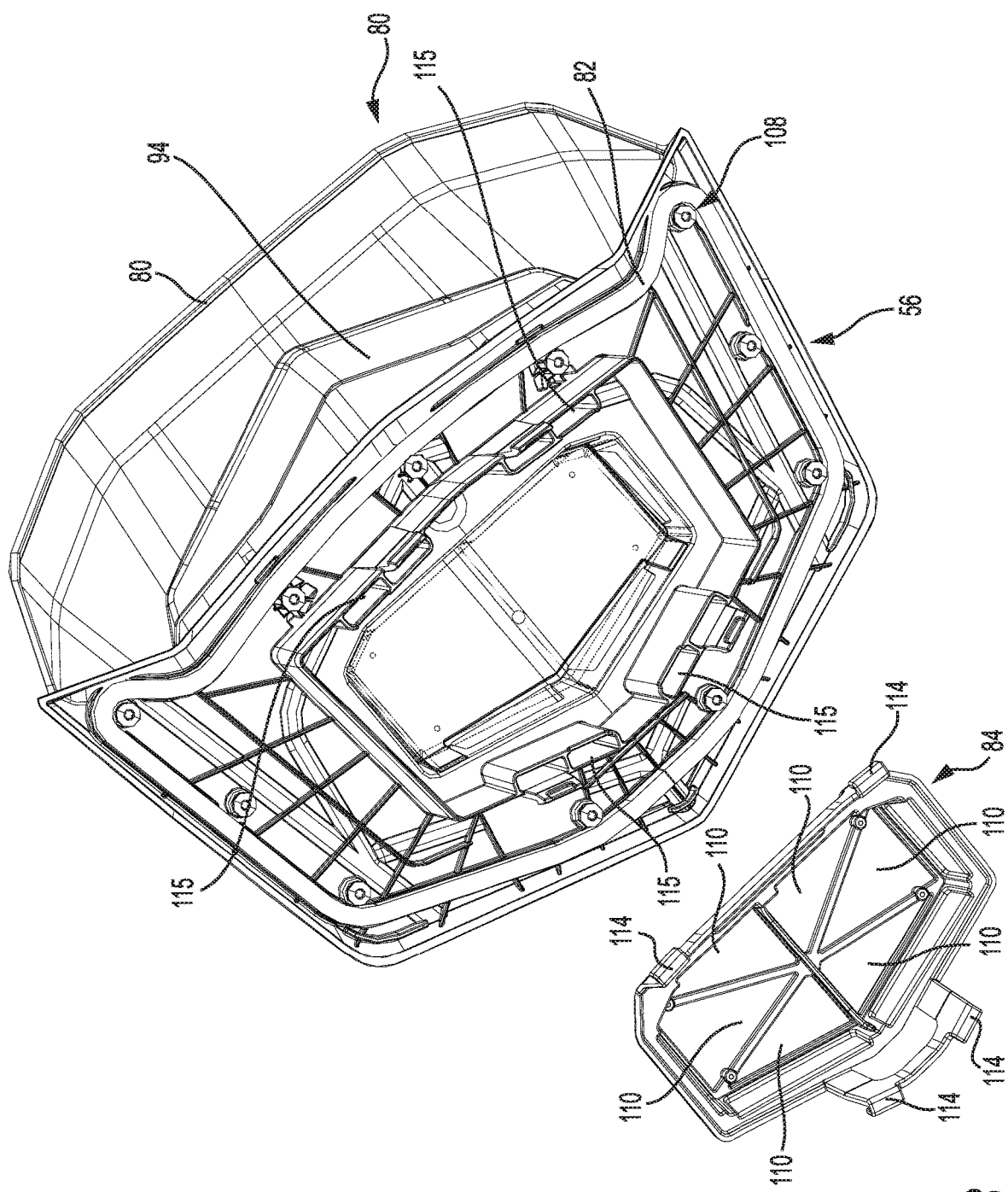
FIG. 8 is a partially exploded view taken from a bottom, front side of a pre-filter housing, base, and hood of the ram air vent of the vehicle of FIG. 1.

After contacting the baffle 94, the air and any water that was not separated out by the baffle 94 are deflected by the baffle 94 and continue through the air passage 81. With reference to FIGS. 3, 5, and 8, the deflected air and water then contact the baffle 100. The baffle 100 extends upwards from the base 56 and is formed as part of the base 56. As can be seen in FIG. 9, a deflector 132, two front parts 134, and two legs 136 form the baffle 100. The baffle 100 is disposed rearward of the baffle 94. The baffle 100 faces the air inlet 92. A water passage 96 is defined at the base of the baffle 100 on the front side of the baffle 100. The baffle 100 has a generally consistent thickness throughout the width of the baffle 100. It is contemplated that the baffle 100 could be a separate part fastened or bonded to the base 56.

As best seen in FIG. 9, the baffle 100 is generally U-shaped, with the deflector 132 at the center of the baffle 100. Spaces are defined between the deflector 132 and the two front parts 134. The two front parts 134 are disposed on either side of the deflector 132. The front parts 134 are angled towards the rear of the base 56. The deflector 132 is the tallest part of the baffle 100, and the height of the front parts 134 taper as they extend towards the sides of the base 56. The legs 136 are each connected to one of the front parts 134 and are angled towards the rear of the base 56. The legs 136 are highest at their most forward point, and taper as they extend towards the rear of the base 56.

When the air and water contact the baffle 100, water is again separated from the air. As can be seen in FIG. 2, the air is deflected by the baffle 100 and continues upwards over the baffle 100. Some of the air also passes in the spaces defined between the deflector 132 and the legs of the baffle 100. As with the baffle 94, the water that is separated falls onto the top surface of the base 56. The water then collects in the water passages 96 and exits the ram air vent 78 via the water outlets 98.

It is contemplated that one of the baffles 94, 100 could be omitted. It is also contemplated that more than two baffles could be provided in the air passage 81.

After passing over the baffle 100, the air and any remaining water that has not been separated out enters the vertical apertures 102. The vertical apertures 102 are defined in the base 56 and are apertures through which air can flow as well as any remaining water that has not been separated out by the baffles 94 and 100. The vertical apertures 102 are on the front, rear and sides of the base 56. Two vertical apertures 102a (FIG. 9) are on the front of the base 56. One vertical aperture 102b is on each of the right and left sides of the base 56. The two vertical apertures 102a on the front of the base 56 and the two vertical apertures 102b on the left and right sides of the base 56 are surrounded by the baffle 100. Two vertical apertures 102c are on the rear of the base 56. The vertical apertures 102 are generally perpendicular to the roof 20. The vertical apertures 102 have a generally trapezoid shape. The base 56 has four legs 104 which, as described in further detail below, are used to secure the base 56 to the outlet vent assembly 90.

Figure 10:
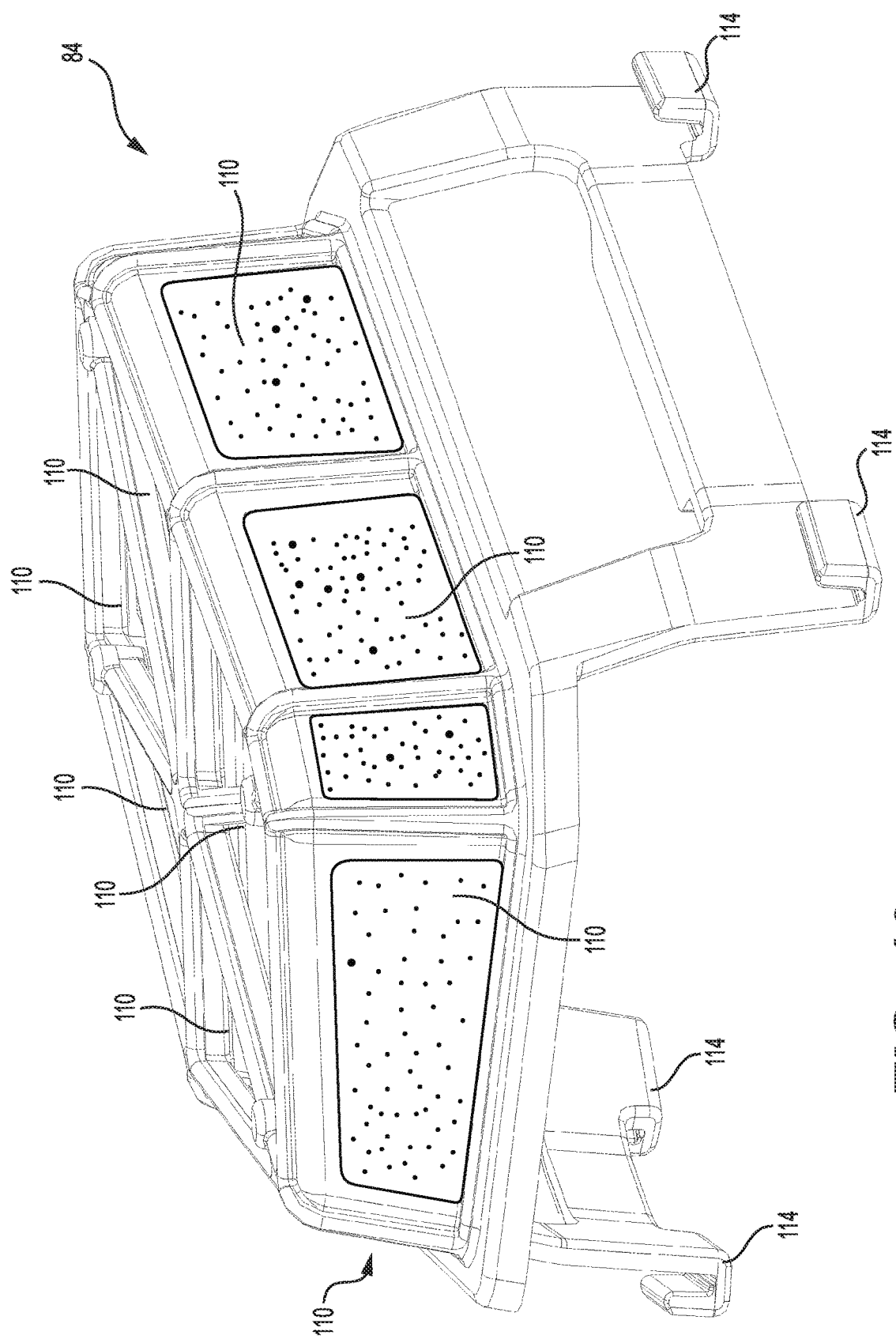
FIG. 10 is a perspective view taken from a front, right side of the pre-filter housing of the ram air vent of the vehicle of FIG. 1.

After air passes through the vertical apertures 102, the air enters the pre-filter housing 84 via the pre-filter apertures 110, best seen in FIG. 10. The pre-filter apertures 110 fluidly communicate with the base aperture 103. Two pre-filter apertures 110 are on a front of the pre-filter housing 84, two pre-filter apertures 110 are on a rear of the pre-filter housing 84, one pre-filter aperture 110 is on a left side of the pre-filter housing 84, and one pre-filter aperture 110 is on a right side of the pre-filter housing 84. The pre-filter apertures 110 on the front, rear, left, and right sides of the pre-filter housing 84 align with corresponding ones of the vertical apertures 102 in the base 56. Six pre-filter apertures 110 are on a top of the pre-filter housing 84. The pre-filter apertures 110 on the front, rear, and sides of the pre-filter housing 84 are generally rectangular shaped. The pre-filter apertures 110 on top of the pre-filter housing 84 are triangular.

The pre-filter housing 84 comprises a hydrophobic mesh 112 that covers each of the pre-filter apertures 110. The hydrophobic mesh 112 further removes any water from the air by allowing air to pass through the hydrophobic mesh 112 but preventing some or all of the water from passing through the hydrophobic mesh 112.

The pre-filter housing 84 is connected to the base 56 under the hood 80. The pre-filter housing 84 has a four legs 114 which are received in corresponding attachment apertures 115 (FIG. 8) on the bottom of the base 56. Each leg 114 has a corresponding aligned attachment aperture 115. The attachment apertures 115 are each adjacent to one of the legs 104 of the base 56. At the end of each leg 114 is a hook. The hooks of the legs 114 slot into the attachment apertures 115. After being slotted into the attachment apertures 115, the hooks at the end of each leg 114 clip onto a protrusion in the corresponding attachment aperture 115 that protrude towards the center of the base 56. The bottom of the legs 114 are also held between the base 56 and the outlet vent assembly 90. The pre-filter housing 84 is removable from the base 56 by disengaging the legs 114 from the attachment apertures 115.

After passing through the hydrophobic mesh 112 and the pre-filter apertures 110, the air passes through the base aperture 103 (FIG. 2). An air filter 88 is disposed between the base aperture 103 and the outlet vent assembly 90. The air filter 88 may be a foam filter or any other type of air filter. The air filter 88 filters dust or debris from the air passing through the base aperture 103. After traveling through the base aperture 103 and the air filter 88, air enters the cabin area 16 via the outlet vent assembly 90.

Figure 11:
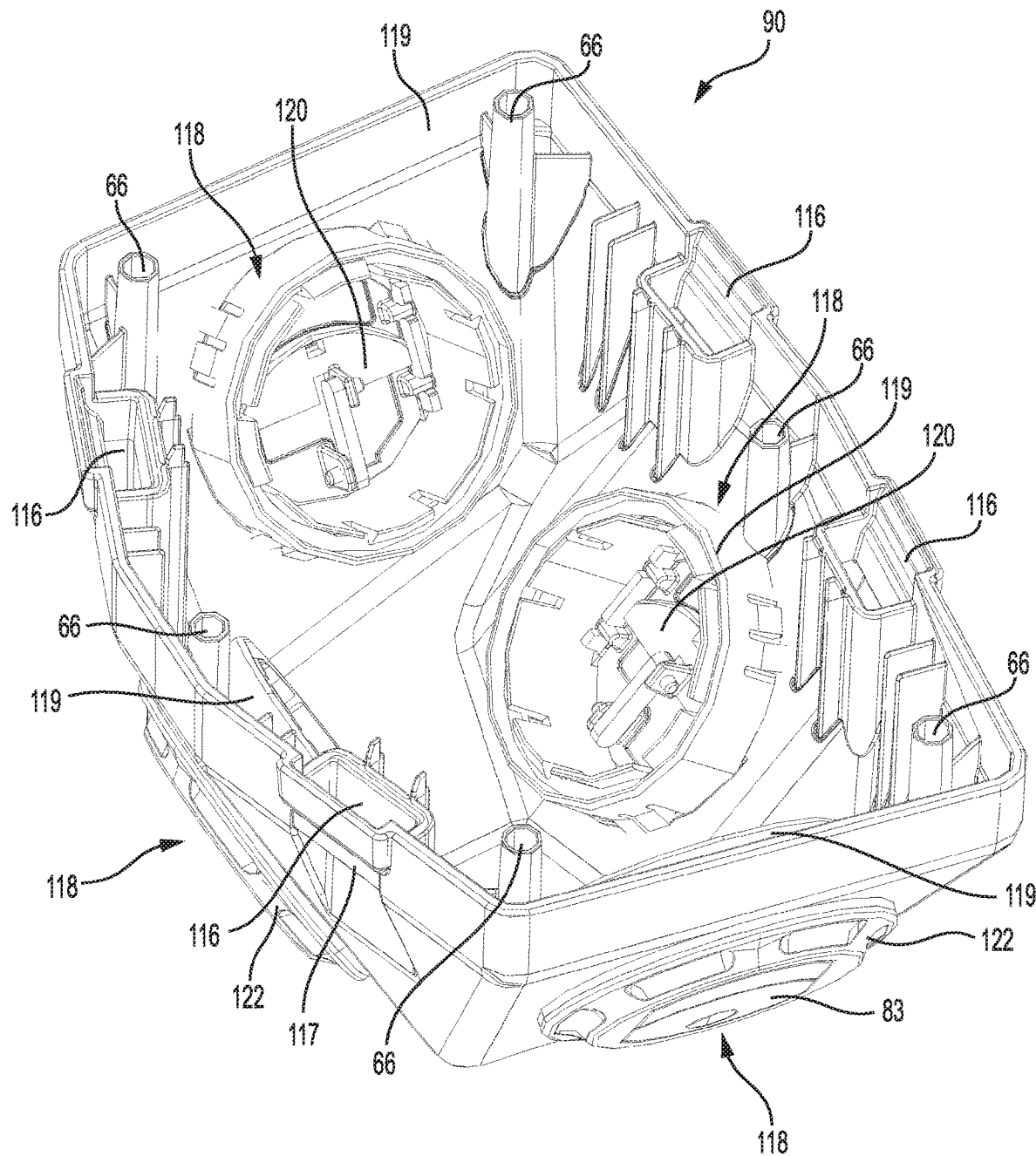
FIG. 11 is a perspective view taken from a rear, right side of an outlet vent assembly of the ram air vent of the vehicle of FIG. 1.

As can be seen in FIG. 11, the outlet vent assembly 90 includes a vent assembly housing 119. The vent assembly housing has four attachment passages 116 that are aligned with the legs 104 of the base 56. The legs 104 are placed in the attachment passages 116. Hooks at the bottom of the legs 104 clip onto bars 117 defining part of the attachment passages 116. By disengaging the legs 104 from the bars 117, the outlet vent assembly 90 can be removed from the bottom surface of the roof 20.

Figure 12:
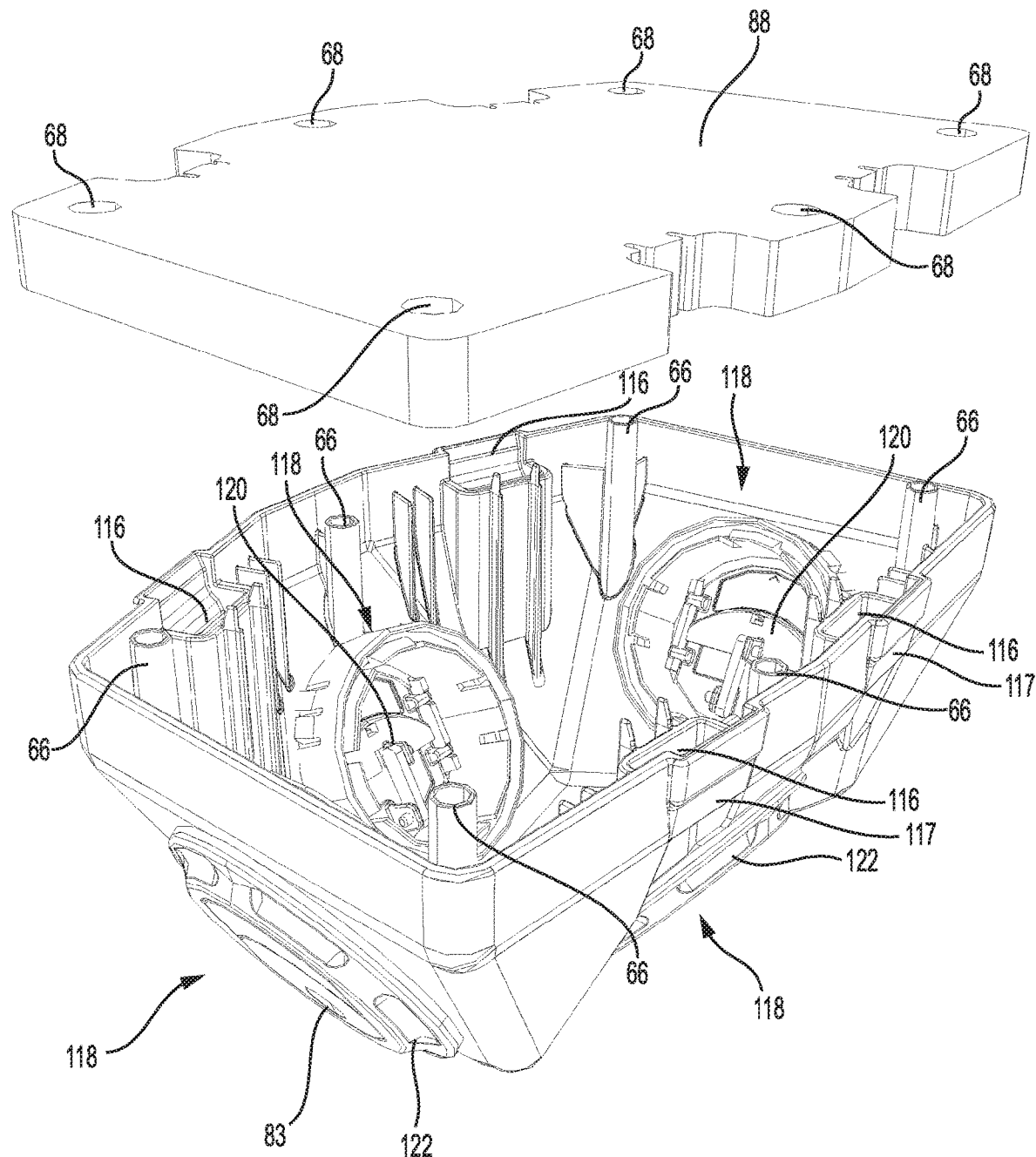
FIG. 12 is a partially exploded view taken from a front, right side of the outlet vent assembly and an air filter of the vehicle of FIG. 1.

Turning now to FIG. 12, the air filter 88 is disposed at the top of the vent assembly housing 119. The air filter 88 has six holes 68 that are used to align the air filter 88 with the vent assembly housing 119. Each hole 68 has a corresponding post 66 protruding out of the top of the vent assembly housing 119. The posts 66 are received in the holes 68. On the front and rear side of the air filter are cutouts that correspond to the attachment passages 116 in the vent assembly housing 119. When the air filter 88 is placed in the vent assembly housing 119, the top surface of the air filter 88 is flush with the top of the vent assembly housing 119. As described above, the outlet vent assembly 90 can be detached and removed from the base 56. After detaching the outlet vent assembly 90, the air filter 88 can be removed, such as to be cleaned or replaced.

The vent assembly housing 119 defines four outlet vents 118. The outlet vents 118 are disposed laterally between the seats 18. It is contemplated that any number of outlet vents 118 may be defined in the vent assembly housing 119. As best seen in FIG. 2, the outlet vents 118 fluidly communicate with the base aperture 103 for allowing air to exit the ram air vent 78.

Turning back to FIGS. 11 and 12, the outlet vents 118 are variable outlet vents that allow a user to adjust a degree of opening of the outlet vents 118 and the direction of the air flowing into the cabin area 16. It is contemplated that fixed louvers could be used in place of the variable outlet vents in some implementations. The vent covers 83 are attached to the outlet vents 118. The vent covers 83 include louvers 120 such that the degree of opening of the outlet vents 118 is adjustable. The outlet vents 118 are selectively closable using the louvers 120. The louvers 120 can be positioned to open, close or partially open the outlet vents 118. The outlet vents 118 can be rotated 360 degrees using rotating elements 122. Using the rotating elements 122 and the louvers 120, the user can select the direction of the air flowing into the cabin are 16.

The bottom of the outlet vents 118 is vertically higher than the bottom of the outlet vent assembly 90. As such, should any water have entered the outlet vent assembly 90, this water will pool at the bottom of the vent assembly housing 119 below the outlet vents 118. The water on the bottom of the outlet vent assembly 90 can be emptied by removing the outlet vent assembly 90.

Figure 14:
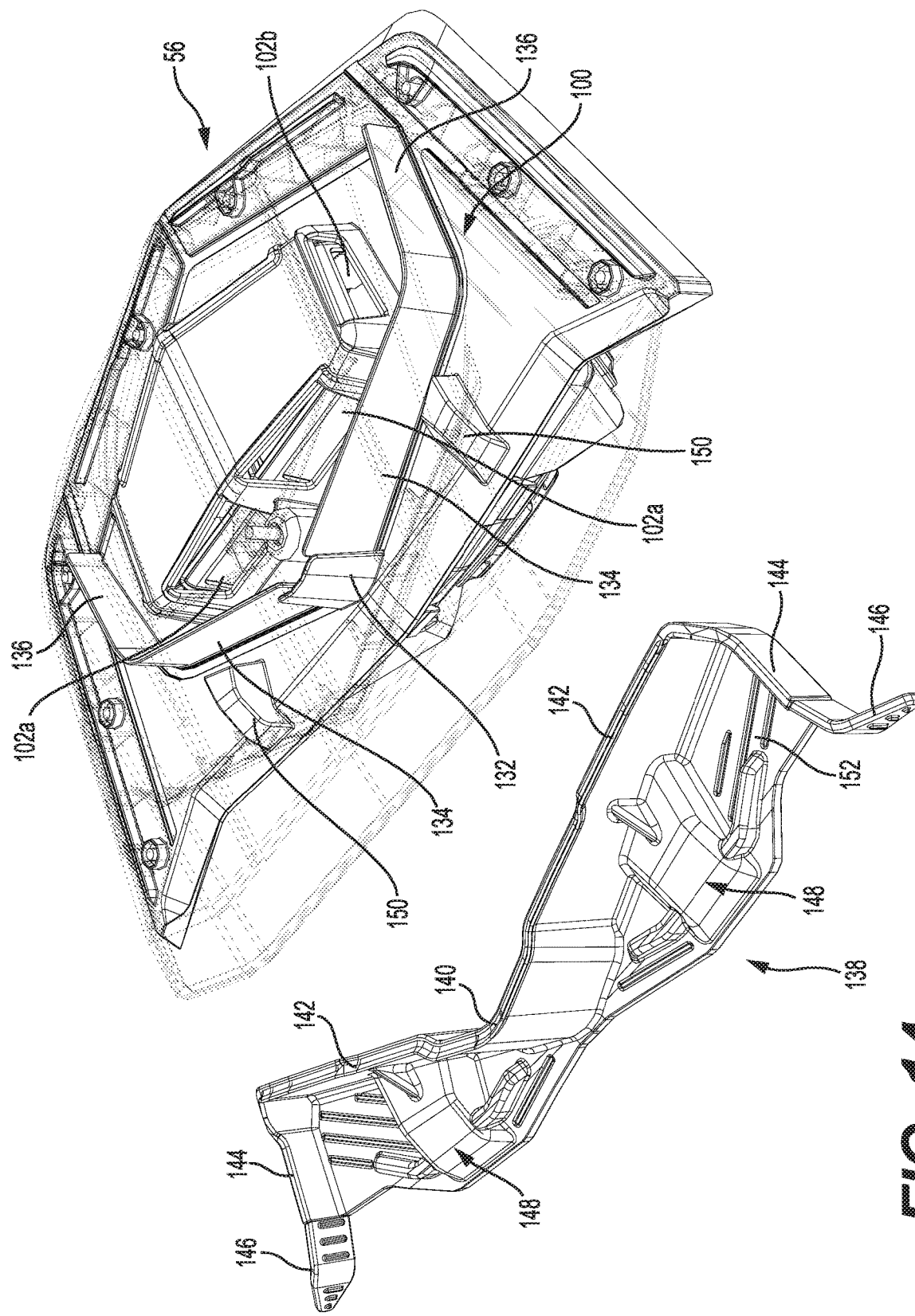
FIG. 14 is a partially exploded view taken from a front, left side of the base of the ram air vent of FIG. 1 and a vent guard.
Figure 15:
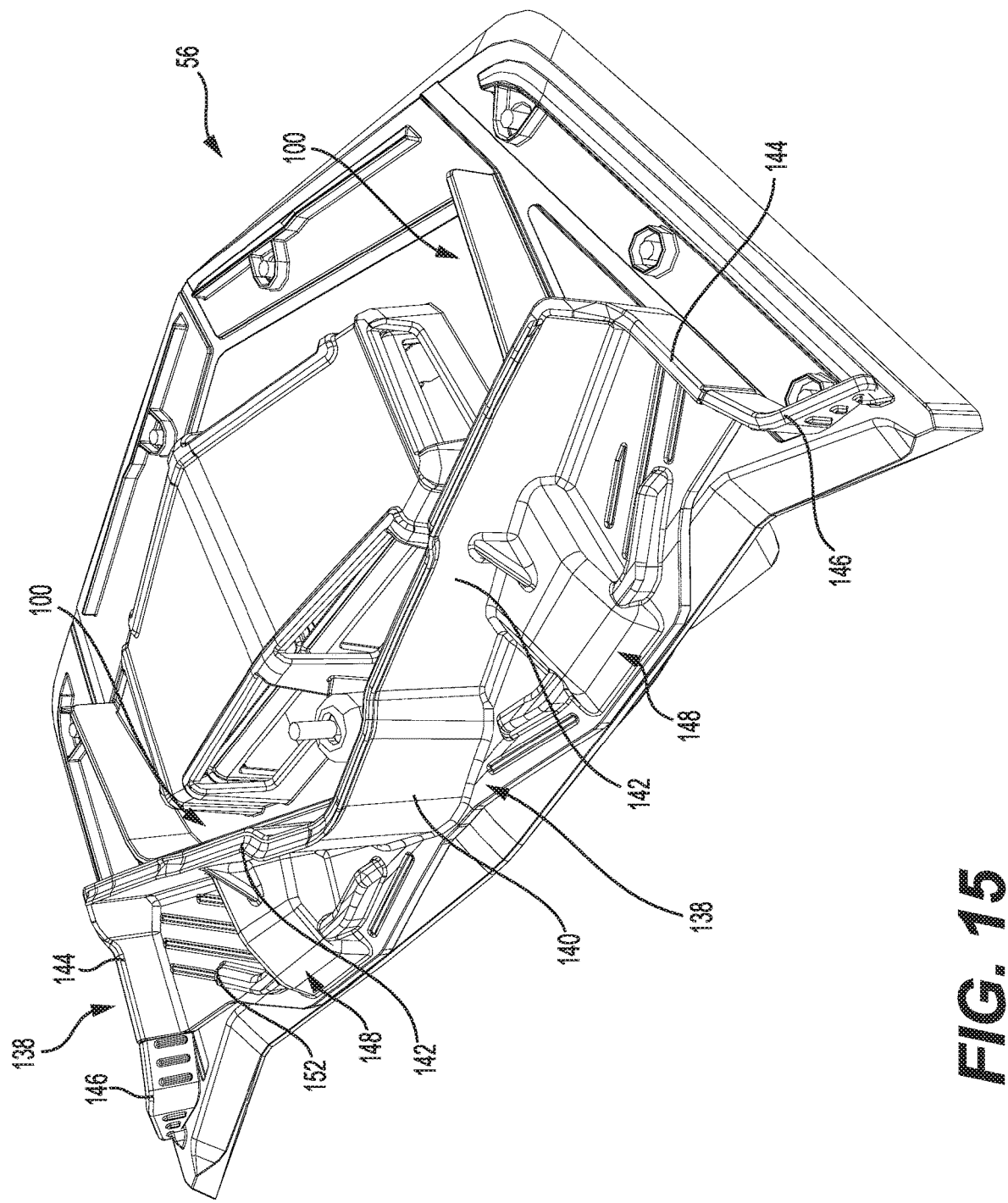
FIG. 15 is a perspective view taken from a front, left side of the base of the ram air vent of FIG. 1 and the vent guard.

Turning now to FIGS. 14 and 15, in some instances, such as when the vehicle 2 is being stored during winter, a user may wish to cover the ram air vent 78. A vent guard 138 may be inserted in the ram air vent 78, such as to prevent for example ice, snow, animals or dust from entering the vehicle 2 via the ram air vent 78. The vent guard 138 seals the air passage 81 (FIG. 2), thereby preventing anything from entering the ram air vent 78. The vent guard 138 is positioned in front of the baffle 100, between the base 56 and the hood 80. A rear surface of the vent guard 138 is flush with the front surface of the baffle 100. The vent guard 138 may be made of rubber or any other suitable material.

The vent guard 138 has a round center portion 140 that corresponds to the deflector 132 of the baffle 100. Two extending portions 142 of the vent guard 138 correspond to the two front parts 134 of the baffle 100. The extending portions 142 are angled towards the rear of the ram air vent 78. The center portion 140 and extending portions 142 of the vent guard 138 are taller than the corresponding parts of the baffle 100. Two legs 144 are disposed on either side of the vent guard 138 and are angled towards the front of the ram air vent 78. Two tabs 146 are on either side of the vent guard 138 and form the ends of the vent guard. The tabs 146 are angled towards the sides of the ram air vent 78. The tabs can be used to remove the vent guard 138 from the ram air vent 78.

The center portion 140, extending portions 142, and legs 144 have a generally uniform thickness. The tabs 146 are slightly thinner than the center portion 140, extending portions 142, and legs 144. The vent guard 138 is tallest at the center portion 140, and the height tapers as the vent guard 138 extends towards the tabs 146. The tops of the center portion 140 and extending portions 142 are flush with the bottom surface of the hood 80.

In front of the extending portions 142 and center portion 140 is a base 152. The base 152 covers a top surface of the base 56. Two covers 148 on the vent guard 138 cover protruding portions 150 on the base 56 (FIG. 14). The covers 148 are in front of the extending portions 142.

The vehicle 2 and/or ram air vent 78 implemented in accordance with some non-limiting implementations of the present technology can be represented as presented in the following numbered clauses.

CLAUSE 1: A ram air vent for a vehicle, the ram air vent comprising: a base defining a base aperture therein; a hood connected to the base over the base aperture, the hood and base defining a forwardly facing air inlet therebetween, the hood and base defining an air passage extending from the air inlet to the base aperture; a baffle disposed in the air passage for deflecting air flowing in the air passage from the air inlet for separating water from air flowing in the air passage, the baffle facing the air inlet; and at least one water passage defined in at least one of the base or the hood, the at least one water passage exiting a rear side of the ram air vent, the at least one water passage draining water separated from air flowing in the air passage from the ram air vent.

CLAUSE 2: The ram air vent of clause 1, wherein the base aperture is disposed generally perpendicularly to the air inlet.

CLAUSE 3: The ram air vent of clause 1 or 2, wherein the at least one water passage has at least one water outlet defined between the hood and the base.

CLAUSE 4: The ram air vent of any one of clauses 1 to 3, wherein the baffle extends downwards from the hood.

CLAUSE 5: The ram air vent of any one of clauses 1 to 4, wherein the baffle is a first baffle, and further comprising a second baffle disposed in the air passage for deflecting air flowing in the air passage from the air inlet for separating water from air flowing in the air passage, the second baffle facing the air inlet and extending upward from the base.

CLAUSE 6: The ram air vent of clause 5, wherein the second baffle is disposed rearward of the first baffle.

CLAUSE 7: The ram air vent of any one of clauses 1 to 6, further comprising an adapter adapted to be disposed between the base and a roof of the vehicle, the adapter being selected from a plurality of adapters each of which is configured for a particular roof type.

CLAUSE 8: The ram air vent of any one of clauses 1 to 7, further comprising a seal disposed on a bottom surface of the base.

CLAUSE 9: The ram air vent of any one of clauses 1 to 8, further comprising an outlet vent assembly connected to the base, the outlet vent assembly being disposed below the base, the outlet vent assembly defining at least one outlet vent fluidly communicating with the base aperture for allowing air to exit the ram air vent.

CLAUSE 10: The ram air vent of clause 9, further comprising an air filter disposed between the base aperture and the at least one outlet vent.

CLAUSE 11: The ram air vent of clause 9 or 10, wherein the at least one outlet vent is at least one variable outlet vent.

CLAUSE 12: The ram air vent of clause 11, wherein: a degree of opening of the at least one variable outlet vent is adjustable; and the at least one variable outlet vent is selectively closable.

CLAUSE 13: The ram air vent of any one of clauses 9 to 12, wherein the outlet vent assembly is selectively connected to the base such that the outlet vent assembly can be removed.

CLAUSE 14: The ram air vent of any one of clauses 9 to 13, wherein a bottom of the at least one variable outlet vent is vertically higher than a bottom of the outlet vent assembly.

CLAUSE 15: The ram air vent of any one of clauses 1 to 14, further comprising: a pre-filter housing connected to the base under the hood and over the base aperture, the pre-filter housing defining at least one pre-filter aperture fluidly communicating the air passage with the base aperture; and a hydrophobic mesh disposed in the at least one pre-filter aperture.

CLAUSE 16: The ram air vent of any one of clauses 1 to 15, wherein the at least one water passage is defined in the base.

CLAUSE 17: A vehicle comprising: a frame; a cabin floor connected to the frame; two doors connected to the frame; a windshield connected to the frame; a roof connected to the frame, the cabin floor, the two doors, the windshield and the floor defining in part a cabin; at least one seat disposed in the cabin; at least one ground engaging member operatively connected to the frame; a motor connected to the frame, the motor being operatively connected to at least one of the at least one ground engaging member; and a ram air vent connected to the roof for supplying air to the cabin, the ram air vent comprising: a base defining a base aperture therein, the base being connected to the roof; a hood connected to the base over the base aperture, the hood and base defining a forwardly facing air inlet therebetween, the hood and base defining an air passage extending from the air inlet to the base aperture, the base aperture fluidly communicating the air passage with the cabin; a baffle disposed in the air passage for deflecting air flowing in the air passage from the air inlet for separating water from air flowing in the air passage, the baffle facing the air inlet; and at least one water passage defined in at least one of the base or the hood, the at least one water passage exiting a rear side of the ram air vent, the at least one water passage draining water separated from air flowing in the air passage from the ram air vent.

CLAUSE 18: The vehicle of clause 17, wherein the base aperture is disposed generally perpendicularly to the air inlet.

CLAUSE 19: The vehicle of clause 17 or 18, wherein the at least one water passage has at least one water outlet defined between the hood and the base.

CLAUSE 20: The vehicle of any one of clauses 17 to 19, wherein the baffle extends downwards from the hood.

CLAUSE 21: The vehicle of any one of clauses 17 to 20, wherein the baffle is a first baffle; and wherein the ram air vent further comprises a second baffle disposed in the air passage for deflecting air flowing in the air passage from the air inlet for separating water from air flowing in the air passage, the second baffle facing the air inlet and extending upward from the base.

CLAUSE 22: The vehicle of clause 21, wherein the second baffle is disposed rearward of the first baffle.

CLAUSE 23: The vehicle of any one of clauses 17 to 22, wherein the ram air vent comprises an adapter disposed between the base and the roof, the adapter selected from a plurality of adapters each of which is configured for a particular roof type.

CLAUSE 24: The vehicle of any one of clauses 17 to 23, wherein the ram air vent further comprises a seal disposed between the base and the roof.

CLAUSE 25: The vehicle of any one of clauses 17 to 24, wherein the ram air vent further comprises an outlet vent assembly connected to the base, the outlet vent assembly being disposed below the base inside the cabin, the outlet vent assembly defining at least one outlet vent fluidly communicating with the base aperture for allowing air to exit the ram air vent and to flow into the cabin.

CLAUSE 26: The vehicle of clause 25, wherein the ram air vent comprises an air filter disposed between the base aperture and the at least one outlet vent.

CLAUSE 27: The vehicle of clause 25 or 26, wherein the at least one outlet vent is at least one variable outlet vent.

CLAUSE 28: The vehicle of clause 27, wherein: a degree of opening of the at least one variable outlet vent is adjustable; and the at least one variable outlet vent is selectively closeable.

CLAUSE 29: The vehicle of any one of clauses 25 to 28, wherein the outlet vent assembly is selectively connected to the base such that the vent assembly can be removed.

CLAUSE 30: The vehicle of any one of clauses 25 to 29, wherein a bottom of the at least one variable outlet vent is disposed above a bottom of the outlet vent assembly.

CLAUSE 31: The vehicle of any one of clauses 25 to 30, wherein the at least one seat is two seats disposed side-by-side, and wherein the at least one outlet vent is disposed laterally between the two seats.

CLAUSE 32: The vehicle of any one of clauses 17 to 31, wherein the ram air vent further comprises: a pre-filter housing connected to the base under the hood and over the base aperture, the pre-filter housing defining at least one pre-filter aperture fluidly communicating the air passage with the base aperture; and a hydrophobic mesh disposed in the at least one pre-filter aperture.

CLAUSE 33: The vehicle of any one of clauses 17 to 32, wherein the ram air vent is removable from the roof.

CLAUSE 34: The vehicle of any one of clauses 17 to 33, wherein: the at least one ground engaging member is four wheels; and the vehicle further comprises a roll cage connected to the frame and disposed over the at least one seat.

CLAUSE 35: The vehicle of any one of clauses 17 to 34, wherein the at least one water passage is defined in the base.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A ram air vent for a vehicle, the vehicle having a front side and a rear side, the vehicle comprising front wheels, rear wheels, a driver seat and a steering wheel in front of the driver seat, the ram air vent comprising:
   a base defining a base aperture therein, the base being configured and arranged for connecting to a roof of the vehicle;
   a hood connected to the base over the base aperture,
   the hood and base defining an air inlet therebetween, the air inlet being configured to face the front side of the vehicle,
   the hood and base defining an air passage extending from the air inlet to the base aperture;
   a first baffle and a second baffle disposed in the air passage for deflecting air flowing in the air passage from the air inlet and configured for separating water from air flowing in the air passage, the first baffle and the second baffle facing the air inlet, the first baffle extending downwards from a surface of the hood, the second baffle extending upwards from a surface of the base;
   one or more vertical apertures for directing air flowing in the air passage from the first baffle and the second baffle and configured so that all the air flowing in the air passage to the base aperture flows through the one or more vertical apertures, wherein, subsequent to entering the one or more vertical apertures, the ram air vent is configured to direct the air flowing in the air passage downwards towards the base aperture, the one or more vertical apertures comprising a front vertical aperture, a side vertical aperture, and a rear vertical aperture, the second baffle partly surrounding the one or more vertical apertures; and at least one water passage defined in at least one of the base or the hood, the at least one water passage exiting a rear side of the ram air vent, the at least one water passage being configured to drain water separated from air flowing in the air passage from the ram air vent, the at least one water passage having at least one water outlet defined between the hood and the base and configured to drain water.

2. The ram air vent of claim 1, wherein the base aperture is disposed perpendicularly to the air inlet.

3. The ram air vent of claim 1, wherein the second baffle is disposed rearward of the first baffle.

4. The ram air vent of claim 1, further comprising an adapter adapted to be disposed between the base and a roof of the vehicle, the adapter being selected from a plurality of adapters each of which is configured for a particular roof type.

5. The ram air vent of claim 1, further comprising a seal disposed on a bottom surface of the base.

6. The ram air vent of claim 1, further comprising:
an outlet vent assembly selectively connected to the base, the outlet vent assembly being disposed below the base, the outlet vent assembly defining at least one outlet vent fluidly communicating with the base aperture for allowing air to exit the ram air vent, characterized in that, the at least one outlet vent is at least one variable outlet vent, wherein:
a degree of opening of the at least one variable outlet vent is adjustable; and
the at least one variable outlet vent is closable.

7. The ram air vent of claim 6, further comprising an air filter disposed between the base aperture and the at least one outlet vent.

8. The vehicle of claim 6, wherein the second baffle partly surrounds the base aperture.

9. The ram air vent of claim 1, wherein a bottom of the at least one variable outlet vent is vertically higher than a bottom of the outlet vent assembly.

10. The ram air vent of claim 1, further comprising:
a pre-filter housing connected to the base under the hood and over the base aperture, the pre-filter housing defining at least one pre-filter aperture fluidly communicating the air passage with the base aperture; and
a hydrophobic mesh disposed in the at least one pre-filter aperture.

11. A vehicle comprising:
a frame;
a cabin floor connected to the frame;
two doors connected to the frame;
a windshield connected to the frame;
a roof connected to the frame,
the cabin floor, the two doors, the windshield and the floor defining in part a cabin;
at least one seat disposed in the cabin;
at least one ground engaging member operatively connected to the frame;
a motor connected to the frame, the motor being operatively connected to at least one of the at least one ground engaging member; and
the ram air vent according to claim 1 for supplying air to the cabin, wherein:
the ram air vent is removable from the roof,
the base is connected to the roof, and
the base aperture fluidly communicates the air passage with the cabin.

12. The vehicle of claim 11, wherein the ram air vent further comprises an outlet vent assembly connected to the base, the outlet vent assembly being disposed below the base inside the cabin, the outlet vent assembly defining at least one outlet vent fluidly communicating with the base aperture for allowing air to exit the ram air vent and to flow into the cabin.

13. The vehicle of claim 1, wherein:
the at least one water passage is a trough defined in the base; and
the at least one water passage partly surrounds the second baffle and rearward to a rear side of the ram air vent.

14. The ram air vent of claim 1, wherein the base comprises a top surface configured to facilitate collecting water falling on the base in the at least one water passage.

15. The ram air vent of claim 1, wherein the at least one water passage comprises a recess in the base.

16. The ram air vent of claim 1, wherein the at least one water passage at least partly surrounds the one or more vertical apertures.

17. The ram air vent of claim 1, wherein the at least one water passage is located upstream from the one or more vertical apertures.

18. The ram air vent of claim 1, wherein the second baffle is U-shaped.

* * * * *